United States Patent
Diels et al.

(10) Patent No.: US 6,650,682 B1
(45) Date of Patent: Nov. 18, 2003

(54) BI-DIRECTIONAL SHORT PULSE RING LASER

(75) Inventors: Jean-Claude M. Diels, Albuquerque, NM (US); Thien Trang Dang, Albuquerque, NM (US); R. Jason Jones, Albuquerque, NM (US); Matthew J. Bohn, U.S. Air Force Academy, CO (US)

(73) Assignee: University of New Mexico, Albuquerque, NM (US)

(*) Notice: Subject to any disclaimer, the term of this patent is extended or adjusted under 35 U.S.C. 154(b) by 0 days.

(21) Appl. No.: 09/561,197

(22) Filed: Apr. 27, 2000

Related U.S. Application Data

(60) Provisional application No. 60/131,843, filed on Apr. 30, 1999.

(51) Int. Cl.⁷ ............................................. H01S 3/083
(52) U.S. Cl. ............................ 372/94; 372/92; 372/25
(58) Field of Search .......................... 372/93, 94, 92, 372/37, 25

(56) References Cited

U.S. PATENT DOCUMENTS

| | | |
|---|---|---|
| 4,035,081 A | 7/1977 | Sepp et al. |
| 4,124,466 A | 11/1978 | Morrey |
| 4,159,178 A | 6/1979 | Vali et al. |
| 4,180,751 A | 12/1979 | Ammann |
| 4,189,652 A | 2/1980 | Levinos et al. |
| 4,213,705 A | 7/1980 | Sanders |
| 4,277,173 A | 7/1981 | Ljung et al. |
| 4,299,490 A | 11/1981 | Cahill et al. |
| 4,349,907 A | 9/1982 | Campillo |
| 4,514,087 A | 4/1985 | Vescial |
| 4,514,832 A | 4/1985 | Vescial |
| 4,525,843 A | 7/1985 | Diels |
| 4,536,087 A | 8/1985 | Shernoff |
| 4,595,293 A | 6/1986 | Geen |
| 4,610,543 A | 9/1986 | Ferriss |
| 4,639,923 A | 1/1987 | Tang et al. |
| 4,676,643 A | 6/1987 | Vescial |

(List continued on next page.)

OTHER PUBLICATIONS

Bohn, M.J., et al., "Measuring Intracavity Phase Changes by Use of Double Pulses in a Linear Cavity," *Optics Letters*, vol. 22, No. 9, pp 642–644 (May 1, 1997).

Bohn, M.J., et al., "Bidirectional Kerr–Lens Mode–Locked Femtosecond Ring Laser," *Optics Communications*, vol. 141, pp 53–58 (Aug. 15, 1997).

Diddams, S., et al., "Frequency Locking and Unlocking in a Femtosecond Ring Laser with Application to Intracavity Phase Measurements," *Applied Physics B*, vol. 63, pp 473–480 (1996).

Jones, R.J., et al., "Solid–State Laser Gyro Using ZnS for Kerr–Lens Mode Locking," *CLEO 1998* (May 7, 1998).

*Primary Examiner*—Leon Scott, Jr.
(74) *Attorney, Agent, or Firm*—Andrea L. Mays; Jeffrey D. Myers

(57) ABSTRACT

A bi-directional pulsed ring laser that produces bi-directional light pulses that interact in such a way that they are phase conjugated. A nonlinear substance, such as a nonlinear crystal or fluid, that has an index of refraction that is dependent upon light intensity is located near a beam waist of the laser cavity to provide a self-lensing effect. Methods for reducing dead band beyond observable limits are also provided. The increased sensitivity of the bi-directional pulsed ring laser provides application in detecting magnetic susceptibility by detecting the change in phase between the arrival times of the bi-directional pulses at a modulator and the electrical signal of the modulator to determine the change in frequency of a coil that has magnetic susceptibility.

46 Claims, 20 Drawing Sheets

U.S. PATENT DOCUMENTS

| | | |
|---|---|---|
| 4,836,675 A | 6/1989 | Hendow |
| 4,837,774 A | 6/1989 | Jabr et al. |
| 4,844,615 A | 7/1989 | Benoist |
| 4,863,272 A | 9/1989 | Coccoli |
| 4,886,364 A | 12/1989 | Ljung |
| 4,888,705 A | 12/1989 | Friedland |
| 4,921,354 A | 5/1990 | SooHoo |
| 4,923,299 A | 5/1990 | Anderson et al. |
| 5,004,344 A | 4/1991 | Tazartes et al. |
| 5,017,806 A | 5/1991 | Edelstein et al. |
| 5,022,761 A | 6/1991 | Kennedy |
| 5,028,816 A | 7/1991 | Boczar |
| 5,033,057 A | 7/1991 | Bosenberg et al. |
| 5,037,203 A | 8/1991 | Yeh |
| 5,047,668 A | 9/1991 | Bosenberg |
| 5,053,641 A | 10/1991 | Cheng et al. |
| 5,070,260 A | 12/1991 | Wong |
| 5,116,132 A | 5/1992 | Mitchell et al. |
| 5,118,189 A | 6/1992 | Sanders et al. |
| 5,119,385 A | 6/1992 | Aoshima et al. |
| 5,134,622 A | 7/1992 | Deacon |
| 5,144,629 A | 9/1992 | Basu |
| 5,159,487 A | 10/1992 | Geiger et al. |
| RE34,121 E | 11/1992 | Benoist |
| 5,177,633 A | 1/1993 | Wong |
| 5,189,487 A | 2/1993 | Mark et al. |
| 5,191,390 A | 3/1993 | Diels et al. |
| 5,195,104 A | 3/1993 | Geiger et al. |
| 5,208,653 A | 5/1993 | Mark et al. |
| 5,227,911 A | 7/1993 | Schiller et al. |
| 5,233,462 A | 8/1993 | Wong |
| 5,251,230 A | 10/1993 | Lai |
| 5,276,548 A | 1/1994 | Margalith |
| 5,291,503 A | 3/1994 | Geiger et al. |
| 5,296,960 A | 3/1994 | Ellingson et al. |
| 5,305,334 A * | 4/1994 | Margalit et al. ............... 372/15 |
| 5,317,381 A | 5/1994 | Lavin |
| 5,325,229 A | 6/1994 | Millard |
| 5,327,212 A | 7/1994 | Ficalora et al. |
| 5,359,414 A | 10/1994 | Howard et al. |
| 5,363,192 A | 11/1994 | Diels et al. |
| 5,365,366 A | 11/1994 | Kafka et al. |
| 5,367,528 A | 11/1994 | Diels et al. |
| 5,371,752 A | 12/1994 | Powers et al. |
| 5,377,043 A | 12/1994 | Pelouch et al. |
| 5,377,219 A | 12/1994 | Geiger |
| 5,384,636 A | 1/1995 | Martin et al. |
| 5,400,141 A | 3/1995 | Albers et al. |
| 5,406,408 A | 4/1995 | Ellingson et al. |
| 5,406,409 A | 4/1995 | Harlamoff et al. |
| 5,430,543 A | 7/1995 | Howard |
| 5,450,197 A | 9/1995 | Karpinski, Jr. |
| 5,457,707 A | 10/1995 | Sobey et al. |
| 5,517,516 A | 5/1996 | Marshall et al. |
| 5,521,390 A | 5/1996 | Sato et al. |
| 5,594,592 A | 1/1997 | Harlamoff et al. |
| 5,619,517 A | 4/1997 | Dixon |
| 5,634,922 A | 6/1997 | Hirano et al. |
| 5,657,119 A | 8/1997 | Kawasaki et al. |
| 5,661,595 A | 8/1997 | Stamm et al. |
| 5,663,973 A | 9/1997 | Stamm et al. |
| 5,671,241 A | 9/1997 | Stamm et al. |
| 5,687,186 A | 11/1997 | Stultz |
| 5,737,080 A | 4/1998 | Son et al. |
| 5,740,190 A | 4/1998 | Moulton |
| 5,742,626 A | 4/1998 | Mead et al. |
| 5,754,333 A | 5/1998 | Fulbert et al. |
| 5,765,594 A | 6/1998 | Collins et al. |
| 5,771,117 A | 6/1998 | Harris et al. |
| 5,781,571 A | 7/1998 | Nabors et al. |
| 5,786,929 A | 7/1998 | Nabors |
| 5,796,513 A | 8/1998 | Stamm et al. |
| 5,812,305 A | 9/1998 | Blake et al. |
| 5,841,798 A | 11/1998 | Chen et al. |
| 5,847,861 A | 12/1998 | Kafka et al. |
| 5,892,614 A | 4/1999 | Asaba |
| 5,896,220 A | 4/1999 | Stamm et al. |
| 5,900,533 A | 5/1999 | Chou |
| 5,912,910 A | 6/1999 | Sanders et al. |
| 6,014,237 A * | 1/2000 | Abeles et al. ............... 359/124 |

* cited by examiner

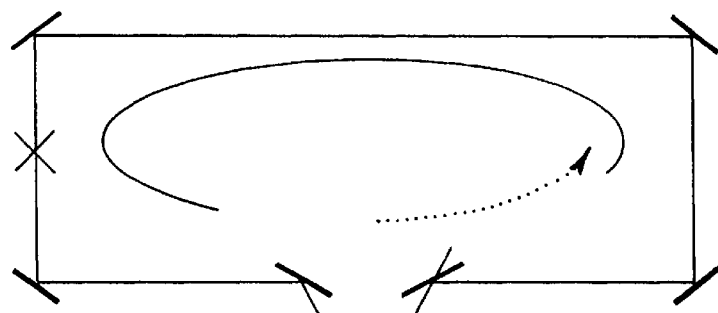
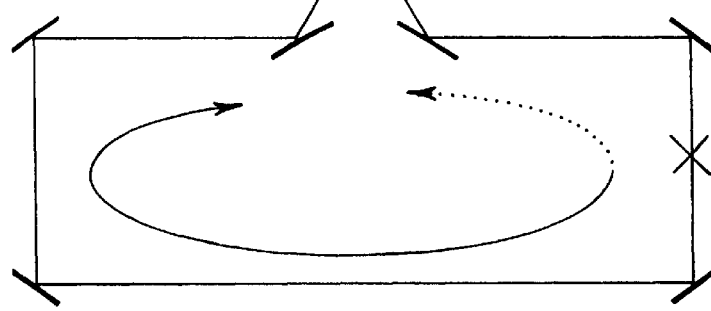
FIG-4b
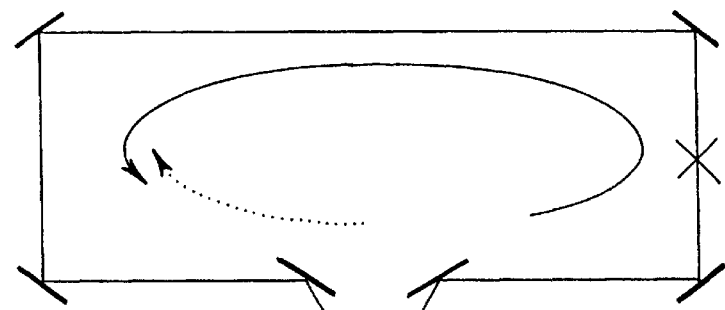
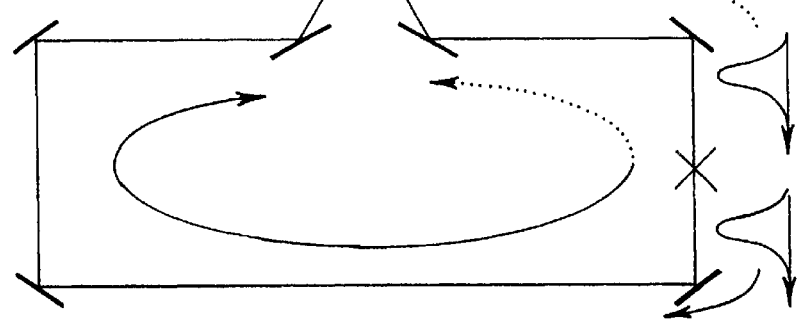
FIG-4a $$\Delta \nu = \frac{R\,\Omega}{\lambda/2} = \frac{4A}{P\lambda}\,\Omega$$

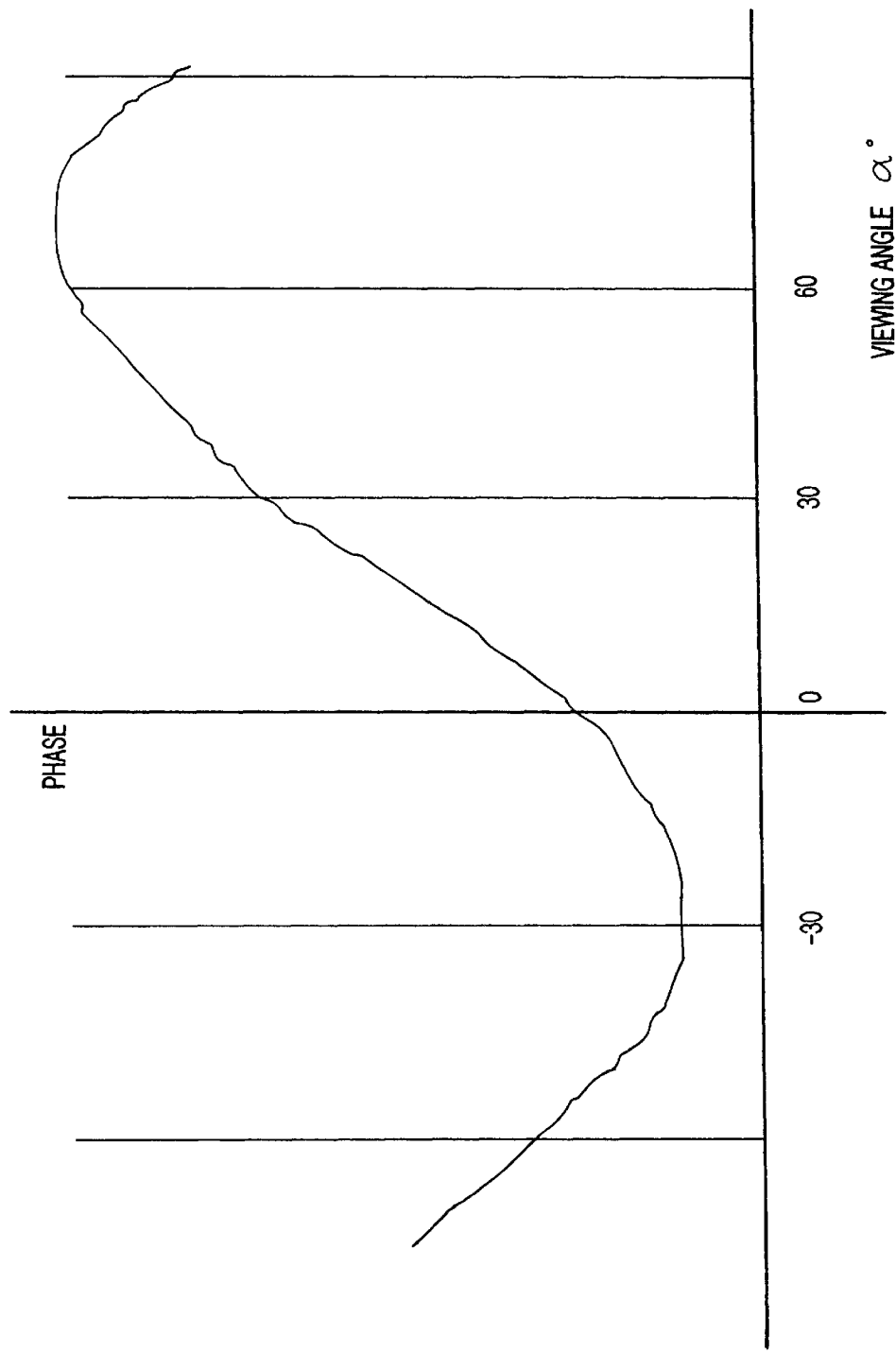

BI-DIRECTIONAL SHORT PULSE RING LASER

CROSS-REFERENCE TO RELATED APPLICATIONS

This application claims the benefit of the filing of U.S. Provisional Patent Application Serial No. 60/131,843, entitled "Mutual Kerr-Lens Mode-Locking", filed on Apr. 30, 1999, and the specification thereof is incorporated herein by reference.

GOVERNMENT RIGHTS

The U.S. Government has a paid-up license in this invention and the right in limited circumstances to require the patent owner to license others on reasonable terms as provided for by the terms of Contract No.ECS9970082 awarded by the National Science Foundation.

BACKGROUND OF THE INVENTION

1. Field of the Invention (Technical Field)

The present invention relates to the field of short pulse ring lasers and applications therefor.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

The gyroscope (gyro) has been in use for navigational purposes since the 1920's, its accuracy improving as technology advanced. Today's state-of-the-art gyroscopes use two counter-propagating beams of continuous wave (CW) light in a ring configuration and take the beat frequency $\Delta\upsilon$ between the two beams to be a measure of the rotation rate $\Omega$.

The principle behind the laser gyro is known as the Sagnac effect. This effect is the phase shift induced by a light beam as it completes a loop, when the plane of the loop is given a rotation. Consider the case where the loop is part of a laser cavity. One condition for lasing is that the cavity length which, to be precise, should be the optical path length of the laser cavity, and the cavity length must be an integral multiple of the wavelength of the light. Hence, the lasing frequency will adjust itself to match the cavity length. When the ring experiences a rotation ($\Omega$) or other non-reciprocal effects, the light travelling in one direction senses a different optical path length than the one travelling in the opposite direction. The light which travels against the rotation sees a slightly shorter path, and hence its frequency is upshifted while the reverse is true for the light travelling with the rotation. By recombining these two beams outside of the ring cavity, one observes a beat frequency $\Delta\upsilon$, which is the difference of the two light frequencies. The following relation is easily derived from consideration of path length changes:

$$\upsilon_0 = \frac{4A}{P\lambda}\Omega = R\Omega$$

where A is the area of the ring which is perpendicular to the rotation axis, $\lambda$ is the wavelength of the light within the ring and P is the ring perimeter. From this equation, note that a) the beat frequency due to rotation (Sagnac effect) is directly proportional to $\Omega$ with the proportionality constant R being determined by the cavity geometry and that b) the plot of $\Omega$ versus $\Delta\upsilon$ should pass through the point (0,0). Deviations from these two conclusions are addressed by the present invention.

The first problem is that of linearity. It was found from the beginning that the counter-propagating beams of light become locked in frequency when the rotation rate was small, leading to the existence of a "dead band" where the gyro has zero response. The solution currently common in the art is to dither the ring thereby shaking the two beams out of the lock-in regime at small rotation rates. Of course, one consequence is that the gyro becomes more cumbersome due to the mechanical dithering devices. In addition, the gyro response near the dithering frequency does not reflect the "actual" rotation rate $\Omega$. Hence, the linear response is still not assured.

If the scattering that causes the lock-in is phase conjugated, the dead band can be reduced. U.S. Pat. No. 4,525,843 to Diels, entitled "Ring Laser with Wavefront Conjugating Beams", discloses a phase conjugating coupling element inside the laser cavity to reduce lock-in. This patent has not been implemented in standard CW laser gyros, but provides background related to laser gyros based on short pulses.

Since the lock-in results from the scattering from either circulating beam into the one circulating in the opposite direction, one solution to eliminate the coupling is to use short pulses, and to ensure that they do not encounter a scattering medium where they cross. One implementation presently put in practice with dye lasers and Ti:sapphire lasers is to use phase conjugated coupling, such as disclosed in the '843 patent, at one crossing point, and ensure that the other crossing point is in air as disclosed by U.S. Pat. No. 5,363,192 to Diels et al., entitled "Mode-Locked Active Gyro Solid State Lasers".

Some possible implementations of the '192 patent use saturable absorbers at a crossing point. The scattering associated with these media can cause lock-in, which can be eliminated by moving the saturable absorber transversally to the laser beam as disclosed in U.S. Pat. No. 5,367,528 also to Diels et al., entitled "Motion Induced Elimination of Dead Band in a Short Pulse Laser Gyro". The ring laser that is mode-locked with a nonlinear substance of the present invention improves upon these prior art patents and provides applications for the unique bi-directional short pulse ring laser of the present invention.

In the case of a short pulse laser gyro as in the '192 patent, an artificial rotation can be obtained by inserting an electro-optic modulator (phase modulator) in the cavity, and pulsing it at the cavity round-trip time, in such a manner as to give a different cavity (optical) length for the pulses circulating clockwise and counterclockwise as disclosed in U.S. Pat. No. 5,251,230 to Lai et al., entitled "Resonant Cavity Dither with Index of Refraction Modulator." As a result of this difference in cavity length, the two trains of pulses will exhibit a different frequency, resulting in a beat note undistinguishable from that corresponding to a rotation. A sufficient artificial rotation will force the laser gyro out of its "dead band". This type of electro-optic dither can be implemented with a short pulse laser gyro of the type mentioned in the '192 patent.

Commercial laser gyros are all He—Ne gas lasers, operating in continuous mode. These gyros are plagued by a dead band, even using very expensive optics that have much less scattering than normal mirrors. Because of this dead band, one has to physically move the laser in order to have the laser operate outside of that range. It defeats the purpose of making a laser gyro, if moving parts are to be used. Further, vacuum tubes such as He—Ne lasers are an obsolete technology. The electrodes have a short lifetime and the laser itself has very low efficiency.

The embodiments of the present invention make it possible to use much more efficient solid state lasers, in particular diode pumped lasers. The dead band is suppressed without introducing a motion of the whole laser. In one of the embodiments, a small motion of one very small component (a solid state saturable absorber, or nonlinear crystal, or a flowing absorber, of a flowing nonlinear liquid) of the laser is used to eliminate a possible dead band. In another embodiment (electronic dithering), the dead band is completely eliminated electronically. In yet another embodiment, the laser is actively mode-locked by one or two modulators. Several applications are provided as well including detection of magnetic susceptibility; measurement of small displacements, measurement of the time derivative of n(t); measurement of high voltage; measurement of the derivative of voltage; and measurement of magnetic and electric fields.

SUMMARY OF THE INVENTION (DISCLOSURE OF THE INVENTION

The present invention is a method of making a bi-directional pulse ring laser and comprises the steps of providing a substance with an index of refraction that is light intensity-dependent; locating the substance in proximity to a beam waist of the laser cavity; and interacting bi-directional light pulses such that they are phase conjugated. The method further comprises the steps of altering the beam diameter within the cavity with the self-lensing effect of the substance and producing bi-directional short light pulses by inserting an aperture in the cavity where the beam diameter decreases with intensity. The laser source comprises either a Ti:sapphire laser, an Nd:vanadate laser, or a Cr:LISAF laser. The nonlinear substance that has an index of refraction that is light intensity-dependent can be either a nonlinear crystal or fluid. The fluid can be provided in a glass cell or free-flowing jet.

The method further comprises reducing residual dead band beyond observable limits, in particular less than that corresponding to the rotation of the earth, in the bi-directional pulse ring laser. Reducing the dead band can comprise electronically modulating with non-constant modulation. By modulating with non-constant modulation, a beat frequency spectrum is provided that is due to rotation alone. The non-constant modulation can comprise electronically modulating with a signal that is symmetrically switched between opposite polarities; this signal can be either a square wave modulation signal or white noise.

Reducing dead band can comprise predetermining and controlling the time at which the bi-directional pulses are launched so that they do not cross at any component within the laser cavity that could cause scattering of the light. Controlling the pulse crossing point can comprise control via traveling wave gate or traveling wave gain. Controlling the launch time can comprise controlling with unidirectional amplification such as with an optical parametric oscillator or with doped gain fibers pumped by a short pulse. Controlling the launch time can alternatively comprise controlling the timing in either direction by a directional optical gate. Controlling with a directional optical gate can comprise controlling a modulator within a fiber laser by providing a first electrical pulse to switch on the modulator and allowing light to pass through the gate in one direction, and then providing a second electrical pulse to switch the modulator, thereby allowing light to then pass in the opposite direction to the first. Alternatively, controlling by unidirectional amplification can comprise the steps of providing a ring laser with bi-directional synchronous pumping and controlling the pulse crossing point with optical delay lines. The ring laser can comprise an optical parametric oscillator that is pumped in two directions by a pulsed laser and preferably the optical parametric oscillator is periodically poled. The method further comprises the steps of using the optical parametric oscillator near degeneracy and reducing the fundamental noise limit by using the idler output instead of the signal through output mirrors.

The present invention is further a method of detecting magnetic susceptibility comprising providing a bi-directional pulsed ring laser, a modulator, an oscillator, and a coil; and detecting the change in phase between the arrival times of the bi-directional pulses at the modulator and the electrical signal of the modulator to determine the change in frequency of the coil. The method further comprises the step of synchronizing the coil frequency and oscillator frequency to the laser cavity repetition frequency. Preferably, the method further comprises achieving the maximum beat frequency in the laser. Detecting comprises sensing a perturbation of the coil and oscillator; changing the phase between the bi-directional pulses at the modulator and the electrical signal of the modulator due to the perturbation; measuring the beat frequency of the laser due to the change in phase; and converting the measured beat frequency into a measure of the coil magnetic susceptibility. Additionally, the laser comprises a fiber laser.

The present invention is also an apparatus for a bi-directional pulsed ring laser comprising a laser, a pump, and a substance having an index of refraction that is light intensity-dependent located in proximity to a beam waist of the laser cavity. The ring laser further comprises an aperture inserted in the laser cavity where beam diameter decreases with intensity to produce bi-directional short light pulses. The laser of the ring laser comprises either a Ti:sapphire laser, an Nd:vanadate laser, or a Cr:LISAF laser. The nonlinear substance can comprise nonlinear crystals or fluids that have an index of refraction that is light intensity-dependent. The fluid can be provided in glass cells or in free-flowing jets.

The ring laser of the present invention further provides means for reducing dead band. Preferably the means for reducing dead band comprises electronic non-constant modulation, which provides a beat frequency spectrum in addition to the one due to rotation alone. The electronic non-constant modulation comprises a signal that is symmetrically switched between opposite polarities, such as square wave modulation. Alternatively, the electronic non-constant modulation can be white noise.

The means for reducing dead band can comprise means for predetermining and controlling the time at which the bi-directional pulses are launched such that they do not cross at any component within the laser cavity that could cause scattering of the light. These means can comprise traveling wave gate or traveling wave gain. Unidirectional amplification can be used such as optical parametric oscillators or doped gain fibers pumped by a short pulse. The traveling wave gate can comprise a directional optical gate for controlling the timing in either direction. This directional optical gate can comprise a modulator within a fiber laser wherein a first electrical pulse switches on the modulator and allows the light to pass through in one direction, and then a second electrical pulse switches the modulator to allow light to then pass in the opposite direction to the first. This continues back and forth as necessary to control the bi-directional pulses.

The unidirectional amplification can alternatively comprise a ring laser with bi-directional synchronous pumping and optical delay lines for controlling the pulse crossing point. This ring laser can comprise an optical parametric oscillator that is pumped in two directions by a pulsed laser, and is preferably periodically poled and is operated near degeneracy.

The present invention is further a magnetic susceptibility detector comprising a bi-directional pulsed ring laser, a modulator, an oscillator, and a coil. Preferably, the frequency of each of the coil and the oscillator are synchronized with the cavity repetition frequency of the laser, and preferably the laser is operating at maximum beat frequency. In the detector, the coil is sensitive to perturbations that cause a change in the phase between the bi-directional pulses of the laser at the modulator and the electrical signal of the modulator, and the beat frequency of the laser is changed due to the change in phase thereby providing a measure of the coil magnetic susceptibility. The laser can be a fiber laser.

A primary object of the present invention is to provide a bi-directional short pulse ring laser with a nonlinear crystal, or other substance, having negligible frequency lock-in.

A primary advantage of the present invention is extremely sensitive measurements of magnetic susceptibility, displacement, voltage, and more.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4 shows a ring laser being switched from a configuration of maximum sensitivity (b) to the configuration of zero sensitivity (a) for elimination of bias frequency in accordance with the present invention;

FIG. 20 is a plot of the beat note, or phase of the backscattered radiation, versus angle of illumination, for the object and irradiation geometry of FIG. 19.

Figure 1:
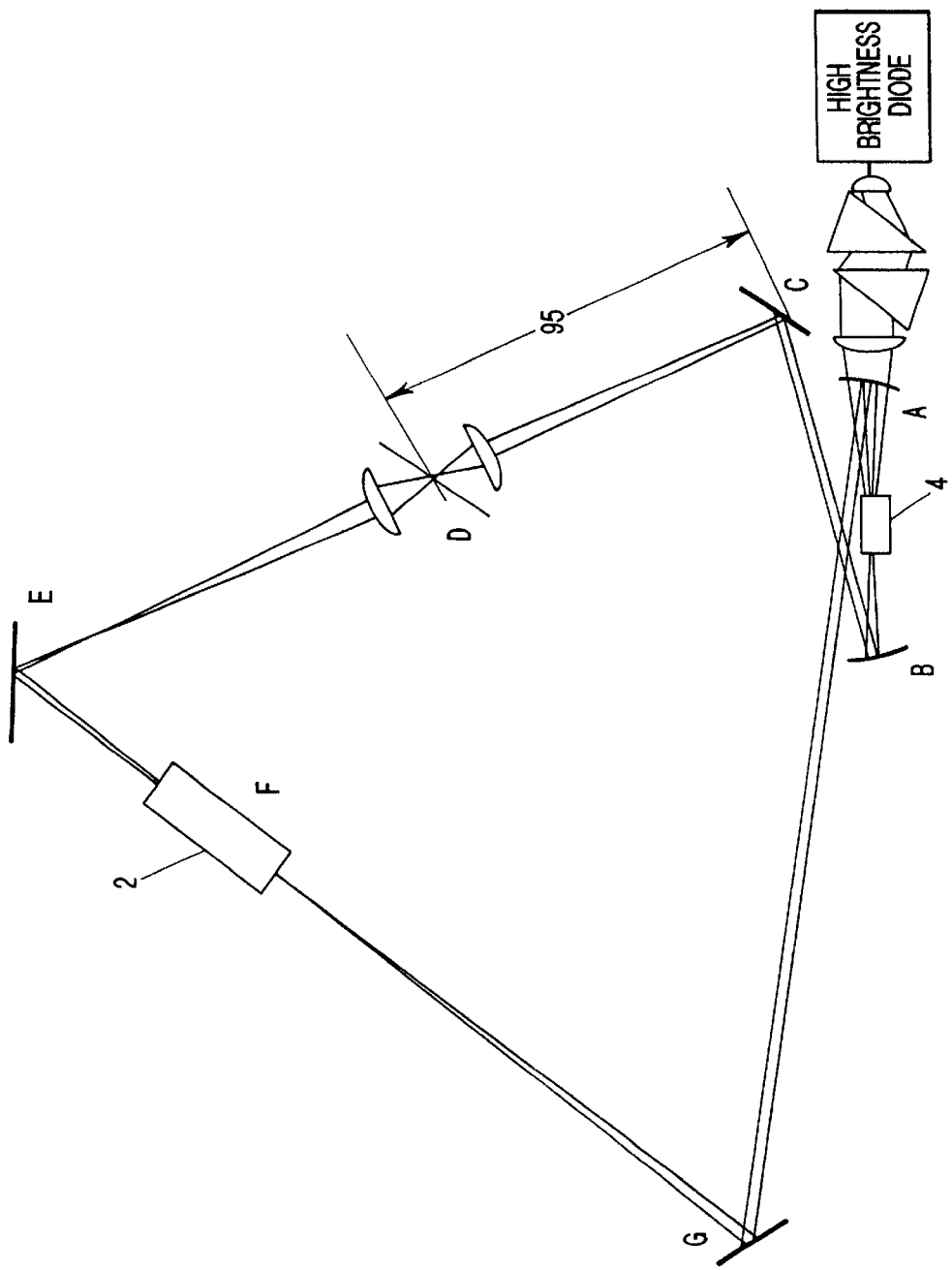
FIG. 1 shows the cavity configuration of the ring laser based on a diode pumped Nd:vanadate crystal in accordance with the present invention.

DESCRIPTION OF THE PREFERRED
EMBODIMENTS (BEST MODES FOR
CARRYING OUT THE INVENTION)

1. Solid State Laser Gyro with Nonlinear Crystal

In the first embodiment of the present invention, a short pulse ring laser gyro is implemented, in which the mechanism for making short pulses is nonlinear-interaction of the counter-propagating beams in a nonlinear crystal. The nonlinear crystal is located in a beam waist of the cavity, or in the proximity of a beam waist. The short pulses are generated through a self-lensing effect in the nonlinear crystal. Because of the intensity dependence of the index of refraction in these crystals, a Gaussian shaped beam profile induces a lens in the nonlinear medium. The effect of this lens is to increase or decrease the beam diameter at some other part of the cavity. By inserting an aperture at some location of the cavity where the beam diameter decreases with intensity, short pulse operation is favored, since the losses decrease with intensity. This effect is enhanced if two pulses cross in the crystal. Therefore, the crystal becomes the meeting point of the two pulses circulating in the cavity. The interaction of the two pulses in the crystal is phase conjugated, and therefore does not result in a lock-in. This effect has been demonstrated in a Ti:sapphire laser with a ZnS crystal. See R. Jason Jones, Matthew J. Bohn, and Jean-Claude Diels, "Solid state laser gyro using ZnS for kerr-lens mode-locking", CLEO, 1998, page 434, San Francisco, Calif., 1998, Optical Society of America; which is incorporated herein by reference. However, the crystal is not a perfect solid state material, and the light scatters at impurities and defects of the crystal, as well as on scratches on the surface, and can result in a dead band. The solution to this problem is the technology disclosed in one or both of the inventions contained in U.S. Pat. No. 5,367,528 and U.S. Pat. No. 5,251,230, incorporated herein by reference.

1.1 Solid State Laser Gyro With a Nonlinear Liquid

In an alternative first embodiment, the crystal is replaced by a liquid material with the same nonlinear properties, such as carbon disulfide ($CS_2$), or a solution of 2-Methyl-4-nitroaniline in ethylene glycol or any other solvent. The liquid can be provided either in a glass cell or in a free flowing jet.

2. Electro-optic Null-Dithering

The present invention also offers a specific improvement on U.S. Pat. No. 5,251,230.

The passively mode-locked laser embodiments with electronic dead band suppression of the present invention use "electro-optic null dithering" which is an electronic equivalent of the elimination of the dead band by moving either the saturable absorber or the nonlinear crystal at the crossing point of the pulses. When implemented with the short pulse laser gyro, the dead band can be completely suppressed, even if there are no moving parts at all in the laser. This technique is applied to a short pulse laser gyro, because it requires acting on the pulse moving clockwise in the cavity, independently of the pulse moving counterclockwise. This is possible in a laser where the pulses are short enough so that they are never at the same instant in the modulator in which the dithering is made. Instead of having an artificial rotation or "bias" imposed on the gyro created by a constant modulation on an intra-cavity crystal, the modulation itself is "square modulated", i.e. given a positive amplitude for a short ($\mu$s) time, then reversing the sign for an equal amount of time, etc. If that modulation is symmetric and fast enough, the beat note spectrum is due to rotation alone. While beat note and beat frequency are both used herein, these terms are to be understood to define the same phenomenon. That is, the frequency components due to the applied bias have averaged out to zero. Attempts to implement such a type of "zero-dithering" mechanically, i.e. by imparting real rotational motions to the gyro, are of course undesirable devices, with significant mechanical components subject to wear, misalignment and the like.

Virtually any type of modulation can be applied electronically as "null-dithering". The various types include square modulation discussed above, and "white noise". Being the equivalent of the random motion of scattering particles in a dye jet, white noise provides good performance.

3. Specific Solid Laser Gyro Systems

Ti:sapphire laser: Most research leading to the present invention has concentrated on Ti:sapphire lasers, mode-locked either by a nonlinear crystal (ZnS) or by a saturable absorber. The advantage is that it is a well known, very efficient short pulse laser. The disadvantage is that it requires another solid state laser as a pump—an Nd:vanadate, frequency-doubled laser operating at 532 nm. The latter is commercially available, but expensive. A logical improvement is to make a laser directly from the Nd:vanadate laser.

Nd:vanadate laser: Attention is turned to FIG. 1. The solid state laser of the present invention can be an Nd:vanadate laser, diode pumped, mode-locked with a saturable absorber or nonlinear crystal 4, without any other intracavity element as shown in FIG. 1. The modulator is shown at 2. Relative dimensions shown on FIG. 1 are as shown in Table 1 below:

TABLE 1

| Measurement | Relative Dimension |
| --- | --- |
| AB | 50 |
| BC | 80 |
| AG | 207.6 |
| GE | 231.1 |
| EC | 231.1 |
| EF | 64 |

Compact diode pumped Nd:vanadate lasers with a continuous output power of 20 W are commercially available. Because the power of this laser is four orders of magnitude larger than that of a He—Ne laser, it has a 10,000 times smaller quantum limit to its gyro response set by the Schawlow-Townes linewidth.

Cr:LISAF laser: As an alternative, the broad bandwidth of the Cr:LISAF laser makes it an ideal candidate for short pulse laser gyro operation. The arrangement is similar to that of FIG. 1, except for the different gain medium. Diode pumping can also be used.

4. Dead Band Elimination Through Unidirectional Gating

Instead of controlling the pulse crossing point through a saturable absorber or a nonlinear crystal, it is possible to launch the counter propagating pulses at a precisely determined and controlled time, such that they do not cross at any component that could cause scatter. Another embodiment of the present invention additionally provides two options: 1) control of the timing in either direction by unidirectional (i.e. travelling wave) amplification, such as can be obtained in parametric oscillator crystals or in doped fibers pumped by a short pulse—the gain is in the direction of the pump pulse; and 2) control of the timing in either direction by a directional gate (i.e. an optical gate that opens only for one direction of propagation of the light).

4.1 "Travelling Wave" Modulators and Optical Parametric Oscillator Lasers

The present invention is also of actively mode-locked lasers wherein the laser is pulsed by electro-optic modulators. In this embodiment, there is no need for any element at the pulse crossing point; the dead band is naturally nonexistent. This is a sophisticated, directional gate. In the electro-optic modulator an electric pulse travels in an electric waveguide, at the same velocity as the optical pulse. This "travelling wave" modulator can only transmit the light in the same direction as the electric pulse is launched. By launching the electrical pulse alternatively in one and then the opposite direction, pulses are generated in the laser cavity that cross at a point controlled by the timing between the optical pulses.

The same effect of directional gating can be obtained with a pair of optical switches (electro-optical modulators). If the two switches are separated by an optical path with a travel time larger than their opening time, one can time them sequentially to achieve either full transmission for light propagating in one or the other direction, or full opacity. This technique can be implemented either in a fiber laser or in a solid state laser where the beams propagate in free space.

Figure 2:
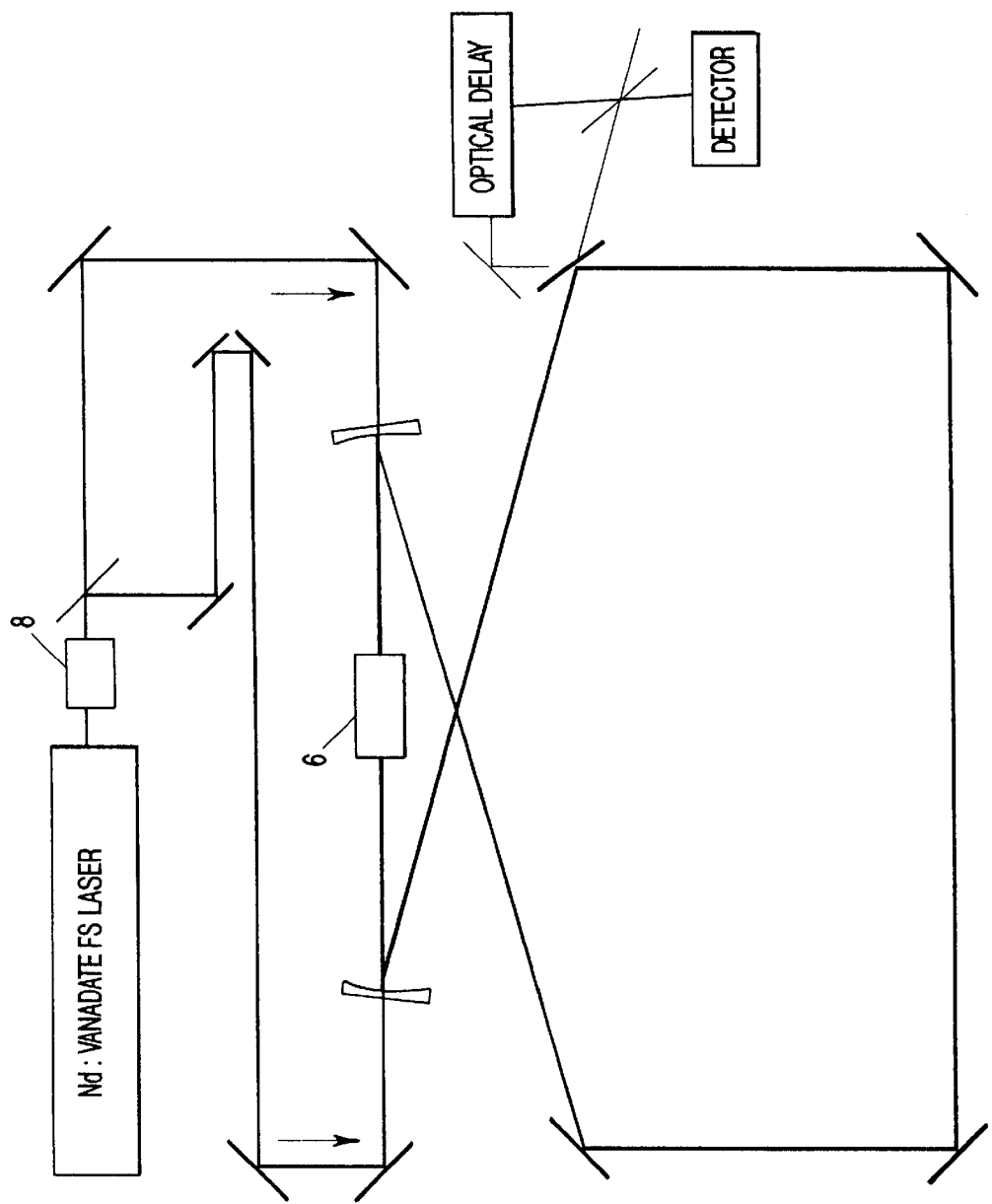
FIG. 2 shows the cavity configuration of the ring laser based on an optical parametric oscillator, ring cavity, pumped in both directions by a mode locked, diode pumped Nd:vanadate laser, in accordance with the present invention.

Attention is now turned to FIG. 2 showing an optical parametric ring oscillator (OPO) 6 that is pumped in two directions by the same Nd:vanadate laser. A Faraday isolator is shown at 8. The crossing point of the pulses in the ring cavity can be adjusted by optical delays of the pump pulses. The advantage of this configuration is that the dead band is totally eliminated, without the need for either mechanical dithering (moving the nonlinear crystal or a saturable absorber) or electro-optic dithering.

The novelty lies in the use of bi-directional, synchronous pumping to make a bi-directional laser, and in the use of optical delay lines for controlling the pulse crossing point. The invention also provides for the reduction of the fundamental noise limit, by using the output of the idler, instead of the signal through output mirrors. Ideally, in this mode of operation, the OPO should be used near degeneracy.

Here also, it is the choice of the pump laser that is the most important in determining cost and performance. A short wavelength is desirable, because, near degeneracy, the OPO wavelength will operate at twice the wavelength of the pump. The Nd:vanadate laser is a good candidate, preferably frequency doubled to 532 nm, which brings the signal and idler back close to 1 micron.

The OPO crystal will typically be a periodically poled crystal to achieve quasi-phasematched operation, with the crystals that have the highest possible nonlinearity, for example periodically poled lithium niobate (PPLN). However, this type of crystal has the disadvantage of being photorefractive. The photorefractive effect manifests itself by the inscription of a permanent index of refraction grating by the pump and laser pulses, which will result in a coupling that will create a pair of pulses meeting in the crystal. Thus, there will be again coupling between the two directions, hence the dead band that was to be avoided.

The photoreflective effects can be eliminated by heating which may result in undesirable convection currents.

The best alternatives currently available are periodically poled KTA and RTA, which have recently been grown. These crystals combine a large nonlinearity, and no photo-refractive effect.

4.2 Fiber Laser Implementation

Figure 3:
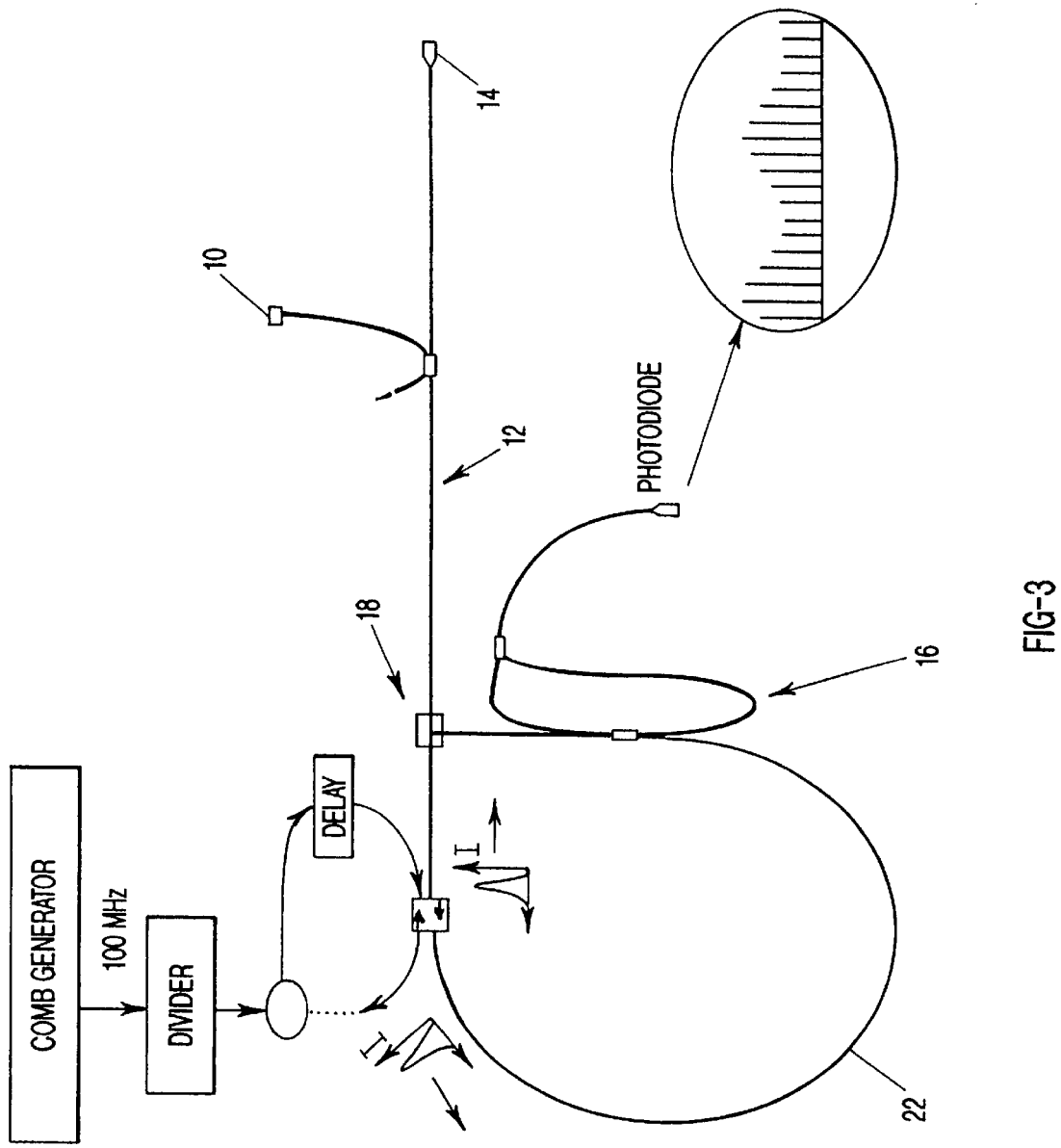
FIG. 3 shows a simple laser cavity having a polarization maintaining fiber and a single mode fiber for the fiber laser implementation of the present invention.

Attention is directed to FIG. 3 which shows a simple ring laser cavity wherein the loop is a polarization maintaining fiber and tail is a single mode fiber 12, such as an Erbium doped fiber. The loop portion 22 senses the rotation rate and the tail section is linear. The loop is preferably a polarization maintaining fiber. The detection loop is shown at 16. The pump diode is shown at 10, which is a 980 nm pump diode. A polarizing beam splitter is shown at 18. Cavity parameters are adjusted to maintain crossing points away from the gain region, splice joints, and various elements which are more likely to scatter light. The gain is placed in the linear tail section of the cavity to maintain greater symmetry for all pulses. The problems arising from polarization effects are minimized by using polarization maintaining fiber in the ring. The linear section is single mode fiber 12. Any depolarization that takes place within this part is compensated for by the use of a Faraday rotator mirror 14 at "the end of the track". This technology is sufficiently well-known and is widely used. Many of the required components are commercially available.

The bi-directional mode-locking of the laser is done with the Mach-Zehnder modulator which is able to act as a gate for the light. In the "off" position, the modulator does not allow light to pass through in either direction. Light is allowed to pass through when the modulator receives an electrical pulse which switches it "on". By a special design, this allows light to pass in one direction only, for example allowing the clockwise light to get through, resulting in an optical clockwise pulse on the other side. After some delay, the modulator receives another electrical pulse which permits the counterclockwise light to traverse the "gate" and a counterclockwise pulse is formed.

There are two technical challenges in this matter: 1) generation of ultrashort electrical pulses (50 ps); and 2) construction of an oscillator of high stability (jitter less than 50 ps). Indeed, the condition for good unidirectional operation of the modulator is that the electrical pulse be short. There are two sources of sufficiently short electrical pulses: a) a commercial pulse generator such as available from Picosecond Pulse Labs; and b) a comb generator.

The problem with the commercial pulse generator is that it does not meet the second requirement, for low jitter. Indeed, it is essential for laser operation that the gate opens as the optically gated pulse returns to the gate following a round-trip through the cavity. Low frequency oscillators (the advantage of fibers is the use of large resonators, low cavity round-trip frequencies) are typically not very stable. A solution is to take a stable high frequency oscillator, on the order of 100 MHz, and divide down its frequency, for instance by a factor 100. Another solution is the use of comb generators, which provide sufficiently short pulses, but, unfortunately, need to be driven at 100 MHz, which is higher than the cavity round-trip rate. One remedy is to operate the comb generator at 100 MHz and divide down the pulse frequency to a comfortable value for the fiber cavity, for instance 1 MHz. A third solution to the jitter problem is to lock the modulator frequency to that of the laser itself. This regenerative mode-locking scheme is widely used for fast repetition rates, such as in the telecommunications industry.

Operating this laser at low repetition rates, with a very large cavity, has unique advantages in the detection of electric and magnetic fields discussed below.

4.3 Other Mode-locked Fiber Implementations

Another alternative embodiment replaces the mode-locking travelling wave modulator by a travelling wave high gain section, pumped by a short pulse from a semiconductor laser. The arrangement is the same as in FIG. 3 with the exception that a gain fiber replaces the modulator, and the "electrical delay cables" are replaced by optical fibers.

The travelling wave high gain section can alternatively be produced by parametric amplification (as originating for instance from Brillouin scattering). The general method and apparatus is the same as discussed above under "Optical Parametric Oscillator Laser", but applied to fibers.

5. Elimination of the Bias Frequency

The short pulse ring laser may have a bias that has to be either measured or eliminated. The present invention deals with that problem by alternatively flipping the sign of the detected rotation, and taking the difference between the two signals. This again is possible in the short pulse laser gyro, where it is possible with modulators to change the sense of circulation of the pulses in the detection loop. Only the true rotation component of the detected signal experiences a change in sign. All other contributions to the bias do not change sign.

Turning to FIG. 4, the ring laser is switched from the configuration of maximum sensitivity (b) to the configuration of zero sensitivity (a). The crosses indicate the pulse crossing points in the cavity. The natural bias of the laser is eliminated by taking the difference between the beat note measurements in either configuration.

The mode-locked ring laser is not only a detector of rotation, but also of magnetic field, non-reciprocal index of refraction and more. Consequently, there is most often a non-zero beat note of $\Delta\upsilon_{bias}$ at zero rotation. One big contributor to the bias frequency $\Delta\upsilon_{bias}$ is the intensity dependent (gain saturation and/or Kerr effect) change in the index of refraction. If the intensity of the pulses circulating in opposite directions in the cavity is different, so will be the index of refraction of the traversed media, and consequently the cavity length and mode frequencies. The bias frequency shifts the $\Omega$ versus $\Delta\upsilon$ curve so that it no longer passes through the origin, $$\Delta\upsilon = \Delta\upsilon_0 + \Delta\upsilon_{bias} \tag{1}$$

The offset $\Delta\upsilon_{bias}$ is not necessarily a constant in time, and hence cannot be eliminated trivially. However, this offset can be eliminated by subtracting the beat note for a cavity with zero area from the beat note of the cavity with a maximum area. It is essential however that the two cavities be geometrically and physically identical. The desired goal is achieved with the design of FIG. 4.

The topology of the ring cavity is essentially a figure eight, where the two symmetrical lobes of the eight are joined by a directional switch. For a number of cavity cycles, the light travels in the same direction in both lobes of the eight, resulting in a maximum sensitivity to rotation. After a time sufficient to establish the beat frequency, the switch is changed, so that the pulses travel through the two lobes in opposite directions, so that the two areas sustained by the pulse trajectories have opposite sign and cancel each other. The Sagnac effect for this latter switch position is null, and the beat frequency is only due to the bias. The difference between the measurements of FIG. 4a and FIG. 4b is the bias due to rotation only.

Figure 5:
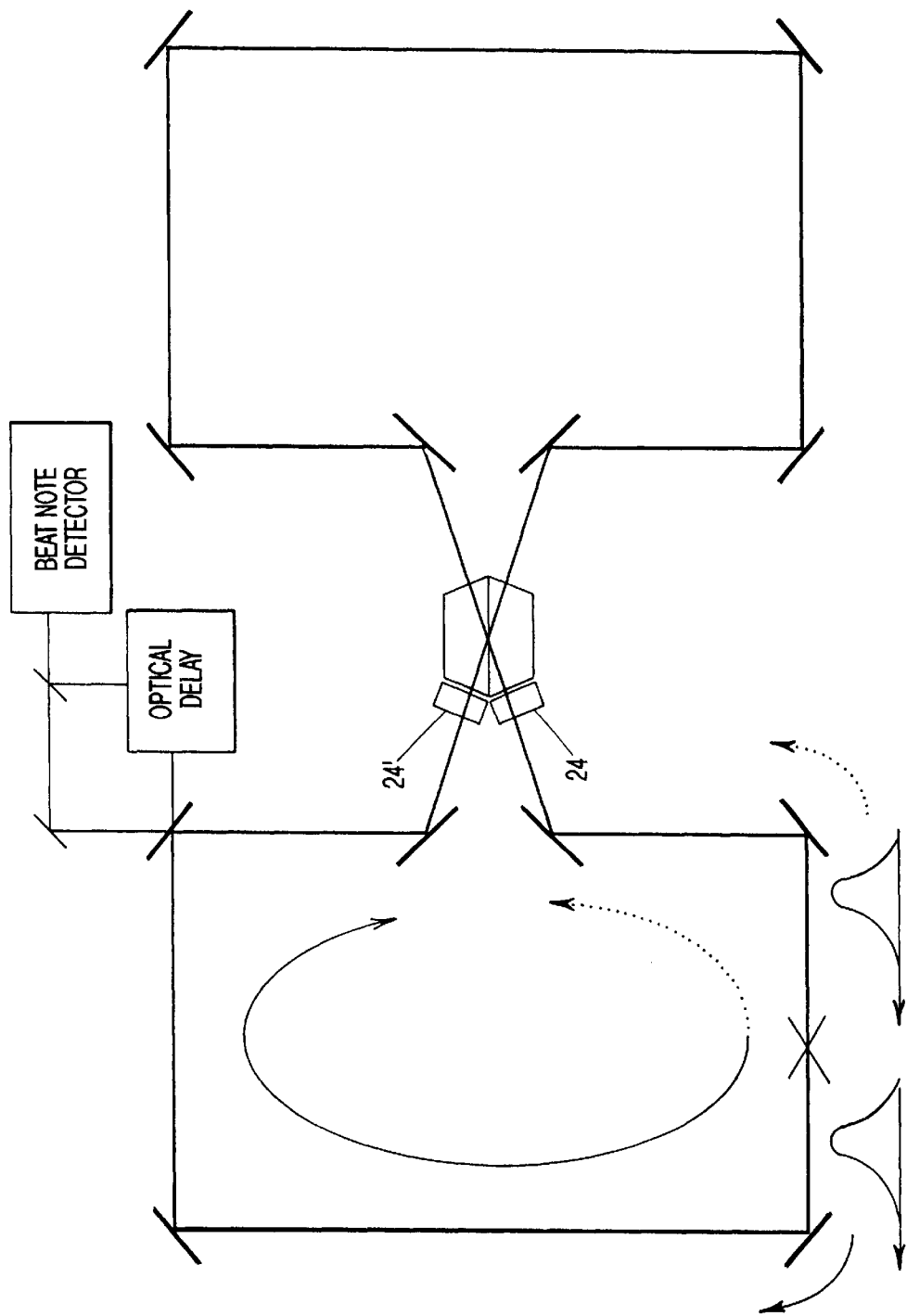
FIG. 5 shows the ring laser switched from maximum sensitivity to zero sensitivity by a combination of electro-optic modulators and a polarizing beam splitter in accordance with the present invention.

FIG. 5 shows the ring laser switched from the configuration of maximum sensitivity to the configuration of zero sensitivity by a combination of electro-optic modulators 24 and 24' and a polarizing beam splitter. Beat note detection is also indicated. Directional switches for such operation are state of the art in the case of the fiber implementation. In the case of discrete component solid state lasers, such a switch can, for instance, be made of two electro-optic modulators 24 and 24' and a polarizing beam splitter, as shown in FIG. 5.

6. Inertial Sensor 6.1 Background and Relation to the Laser Gyro

Figure 13:
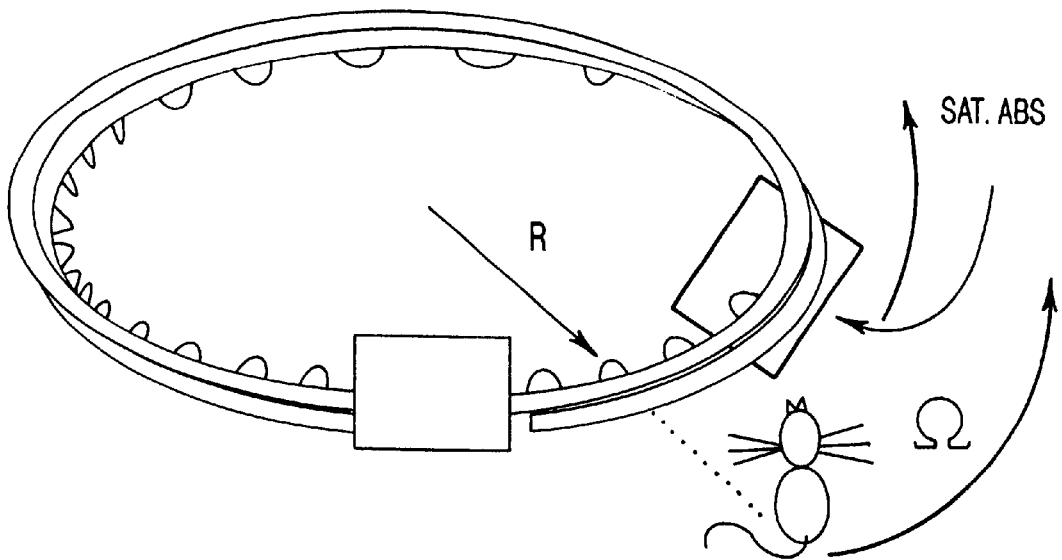
FIG. 13 illustrates a description of the gyro effect. The standing waves are fixed in an absolute frame of reference. The observer, rotating with the laboratory frame at the angular velocity $\Omega$, sees constructive-destructive interferences go by at a rate $\Delta v$.

The applications discussed here deal with a mode-locked (short pulse) ring laser. One of the (nonstandard) descriptions of the operation of the laser is as shown in FIG. 13. The femtosecond ring laser is an instrument in which the phase velocities relate to an absolute frame of reference, and the group velocities are linked to the laboratory frame. A ring laser operating in two directions produces two laser beams at the same frequency, counter-propagating in the ring cavity. As a result, a standing wave pattern is produced, with spacing between "nodes" equal to $\lambda/2$. An observer attached to the laboratory frame, which is rotating at an angular velocity $\Omega$, sees these constructive and destructive interferences go by at a rate given by:

$$\Delta\upsilon = \frac{2R\Omega}{\lambda} = \frac{4A}{P\lambda}\Omega, \tag{2}$$

which is the standard equation that describes the beat note $\Delta\upsilon$ measured by the laser, with A and P being respectively the area and perimeter of the ring laser.

In the pulsed laser described herein, there is an element—saturable absorber or non-linear crystal or some sort of external modulation—that forces the envelope of the pulses to cross at a given point of the cavity. That particular point is locked to the laboratory frame. The standing waves are moving relative to the envelopes of the crossing pulses.

Figure 14:
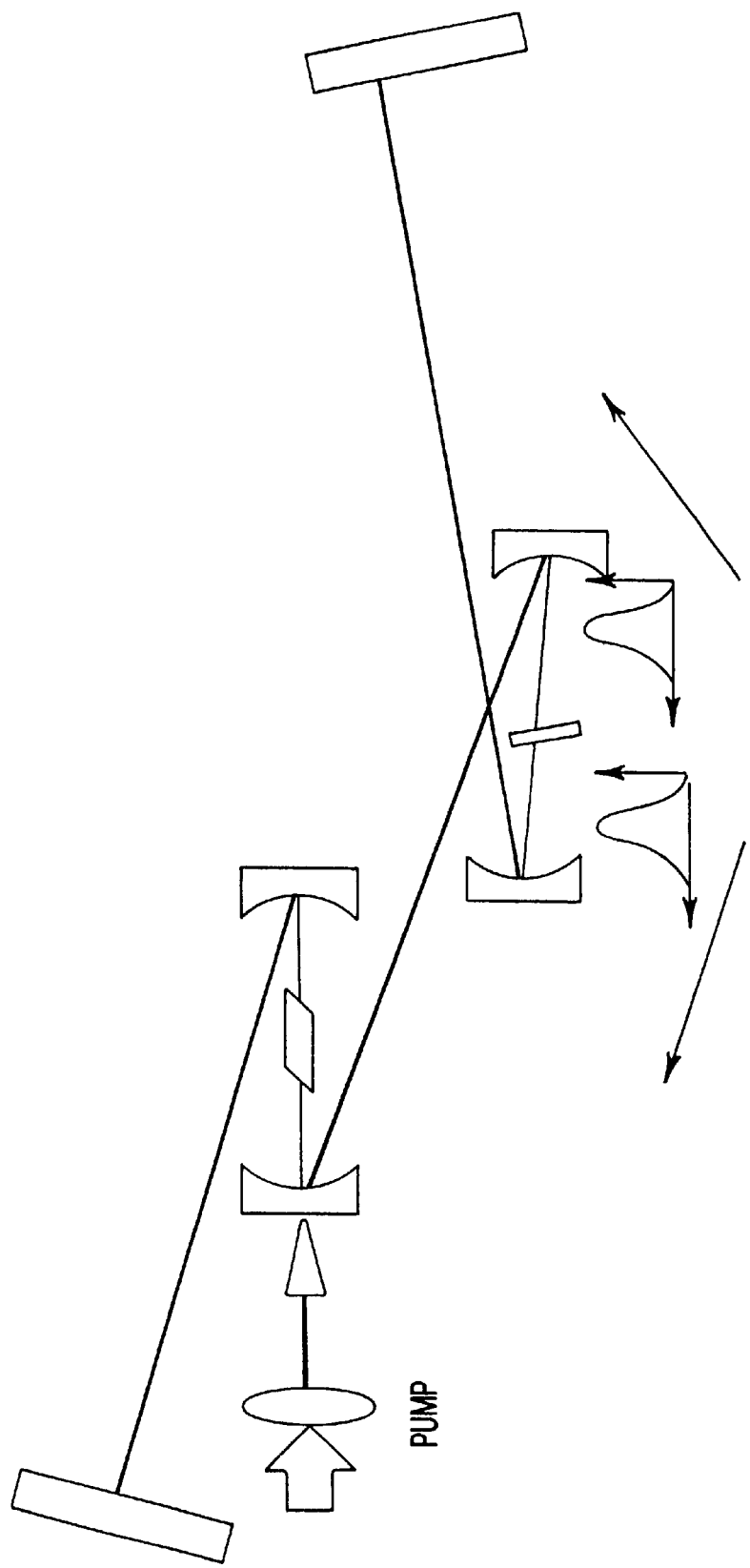
FIG. 14 shows a linear cavity with a saturable absorber, which can be replaced by a nonlinear crystal to demonstrate that the limit of the cavity shape, as it is changed from a circle to an elongated rectangle, is a linear cavity with two pulses per cavity round trip.
Figure 15:
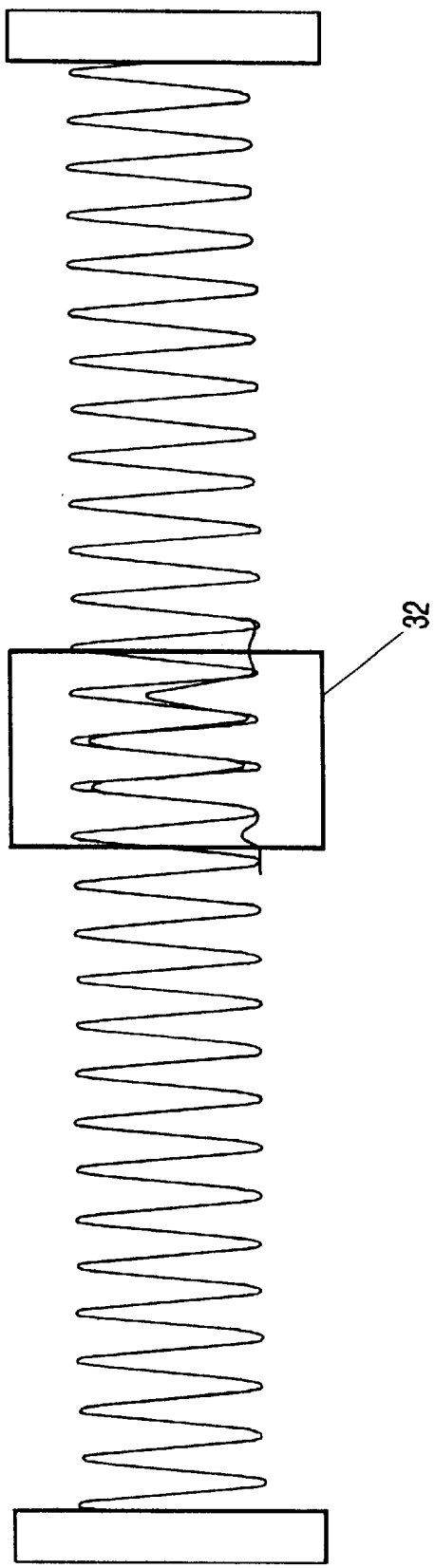
FIG. 15 shows the pulse which is a part of the standing wave, represented throughout the cavity, even though it exists only at the location of the two crossing pulses.

The limit of the cavity shape as it is changed from a circle to an elongated rectangle, is a linear cavity, with two pulses per cavity round-trip, as depicted in FIG. 14. These two pulses can also be made to interfere on a detector. Since they follow the same path in the cavity and pass through each element in the same order, there is no beat note to be measured as the cavity is rotated or moved. However, the relative phase of the standing waves at the point of crossing of the pulse envelopes, relative to the pulse envelope, will change with various linear acceleration of the cavity as shown in FIG. 15. FIG. 15 shows the pulse which is a part of the standing wave represented throughout the cavity, even though it exists only at the location of the two crossing pulses. The envelopes cross in the saturable absorber or a nonlinear crystal shown at 32. The location of the crossing point follows the laboratory frame, while the standing wave is fixed in an absolute frame of reference. Changes in velocity result in changes in phase of the pulses.

Figure 16:
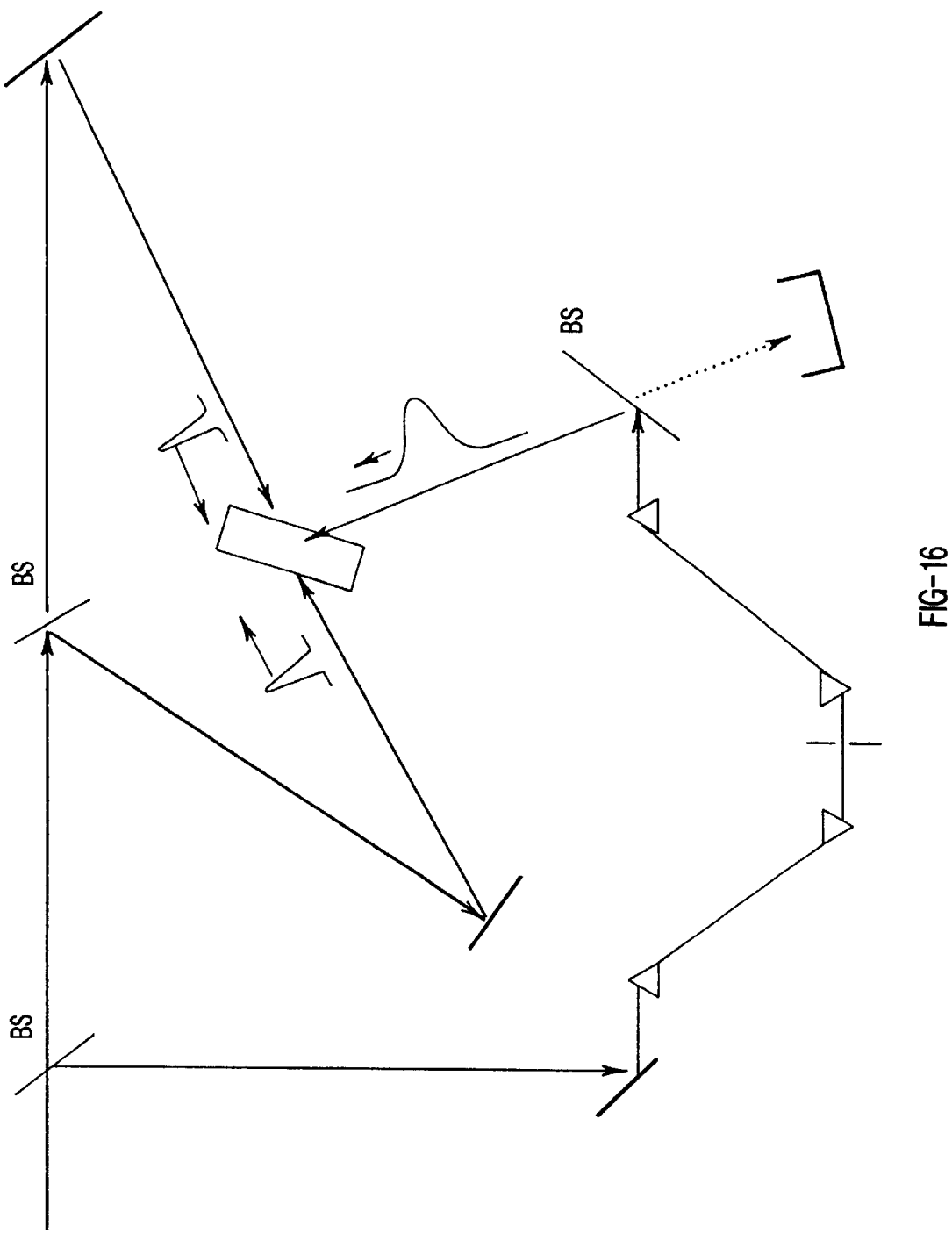
FIG. 16 shows an arrangement to measure the relative phase of a pulse with respect to its envelope in accordance with the present invention; the optional four prism arrangement is to minimize the duration and eventual phase modulation of the pulse probing the nonlinear medium.

The method for monitoring the relative phase of the crossing point is illustrated in FIG. 16. Describing each pulse of index p of the train by its electric field envelope $\epsilon p(t)$ and its phase $\phi_p$:

$$\epsilon_p(t) = e^{i\omega x + \phi_p}. \tag{3}$$

The pulse envelope $\epsilon$ and the carrier frequency $\omega$ are the same for all the pulses. A four wave mixing experiment such as shown in FIG. 14 produces the phase conjugated field:

$$\epsilon_p(t) = e^{i\omega x - \omega_p}. \tag{4}$$

If the fields from Eqs. (3) and (4) are made to interfere in a Michelson or Mach Zender interferometer, the interference signal is proportional to $\cos(2\omega_p)$. The phase conjugated signal comes as a reflection off a nonlinear crystal or saturable absorber, in which two pump pulses are sent simultaneously. The nonlinear crystal or absorber can be the mode-locking element of the laser shown in FIG. 14, and the pump pulses are the intracavity pulses.

7. Picodisplacements

The sensitivity of the ring laser to displacements is of the order of 0.001 A. The extreme sensitivity to displacements makes the present invention applicable to scanning microscopy. Combined with tomographic reconstruction techniques, resolutions that have never before been achieved are now possible with optical microscopes. Applications that require such sensitive displacement measurements are for example the Scanning Tunneling Microscopes, and diagnostics for nanofabrication techniques. All applications listed in U.S. Pat. No. 5,521,390, entitled "Nanodisplacement Producing Apparatus" would be better served with the present invention. The '390 patent uses a highly unstable configuration (doubly resonant OPO) to have the required length sensitivity. The laser used in the '390 patent is preferably continuous. It always requires a pump laser, in addition to the doubly resonant OPO cavity. The principle is totally different from the various pulsed laser of the present invention. Here, stable cavities with only one central frequency circulating in either direction are considered.

7.1 Scanning Tomographic Microscope

Figure 17:
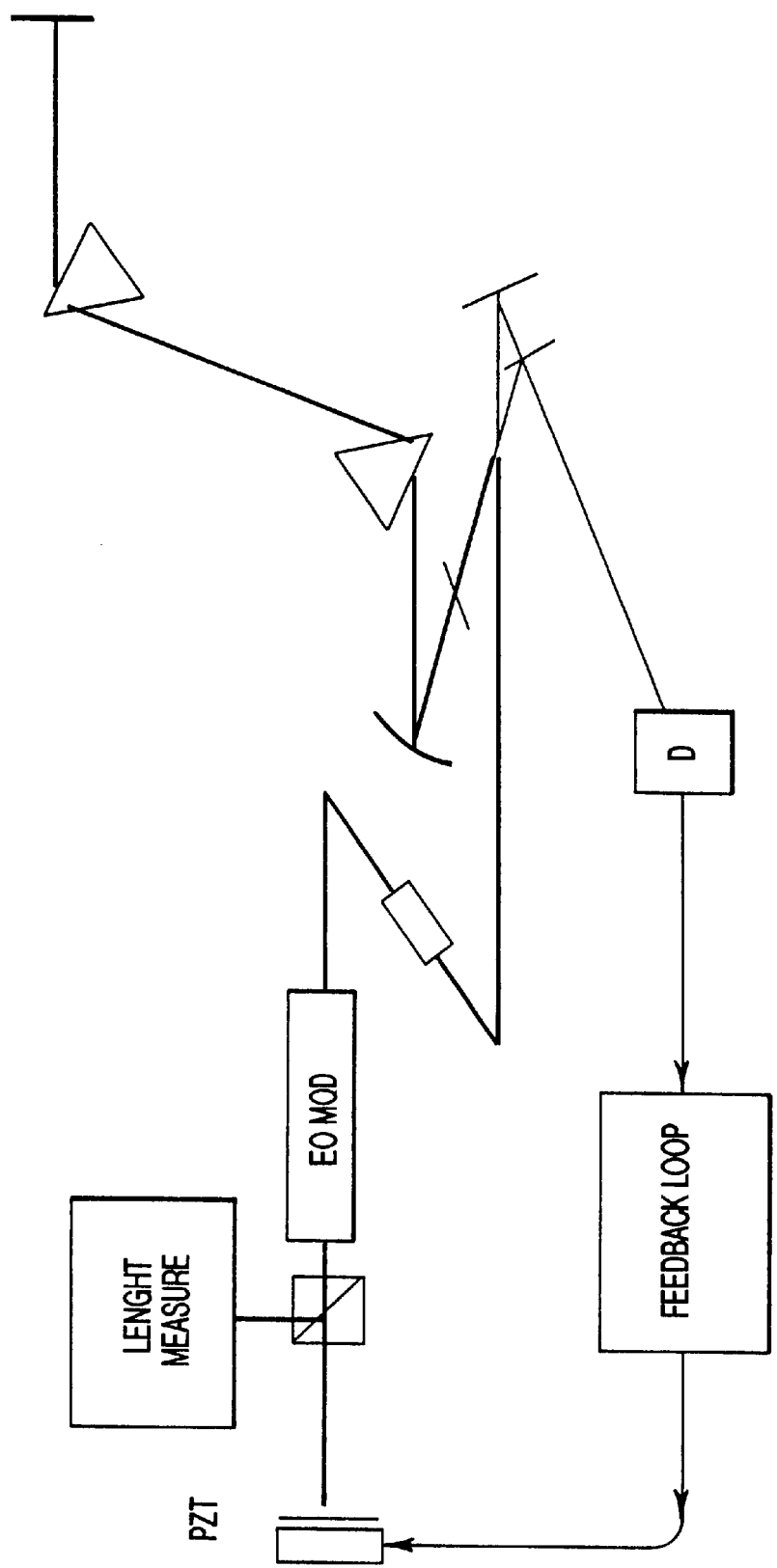
FIG. 17 shows a linear cavity design for the measurement of small, slowly varying changes of length to increase depth resolution of a scanning microscope.
Figure 18:
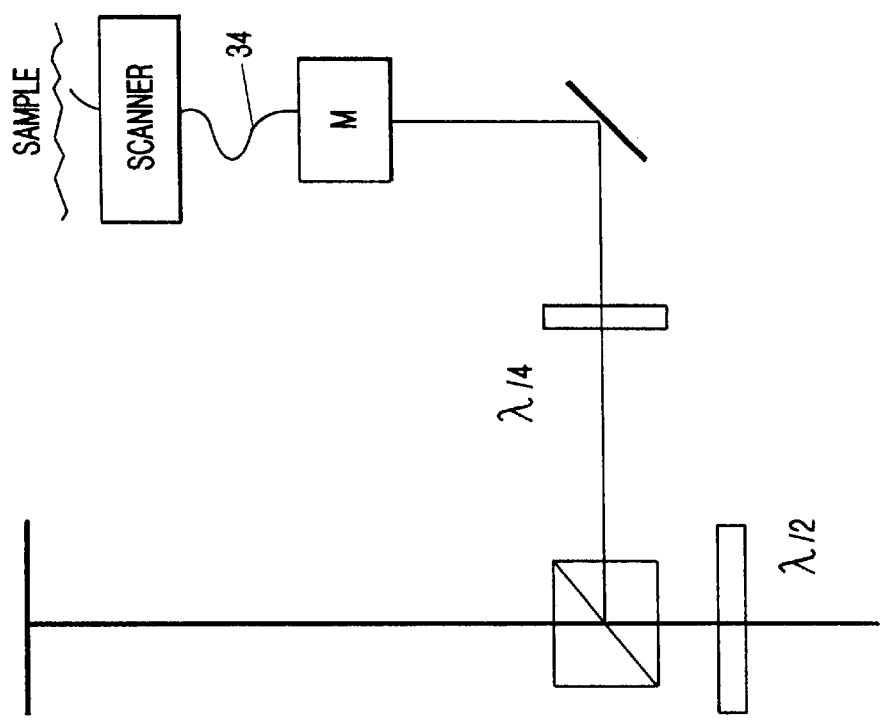
FIG. 18 provides details of the lengths measurement that is taken by the design of FIG. 17.

Attention is now turned to FIG. 17, which shows the linear cavity design for the measurement of small, slowly varying, changes of length in the arm indicated by the box. Details of the lengths measurement are provided in FIG. 18. In FIG. 18 only a portion of the beam is selected to be sent to the fiber being scanned on the surface of the object. A fiber is shown at 34. The scanning has to be performed in the lateral dimensions as well as on the angles with respect to the surface.

One of the implementations of the laser gyro is to detect motions of a fraction of Å. In FIG. 17 the beat note is proportional to the path difference between the two arms of the cavity. If one path is part of a scanning microscope, the depth can be scanned with an unprecedented resolution. To transfer that resolution to the lateral dimensions, it is necessary to make views from various angles, and use tomographic reconstruction techniques. Instead of the full intra-cavity power going through the tip of the microscope, only a very small sampling can be used which reduces resolution.

Figure 19:
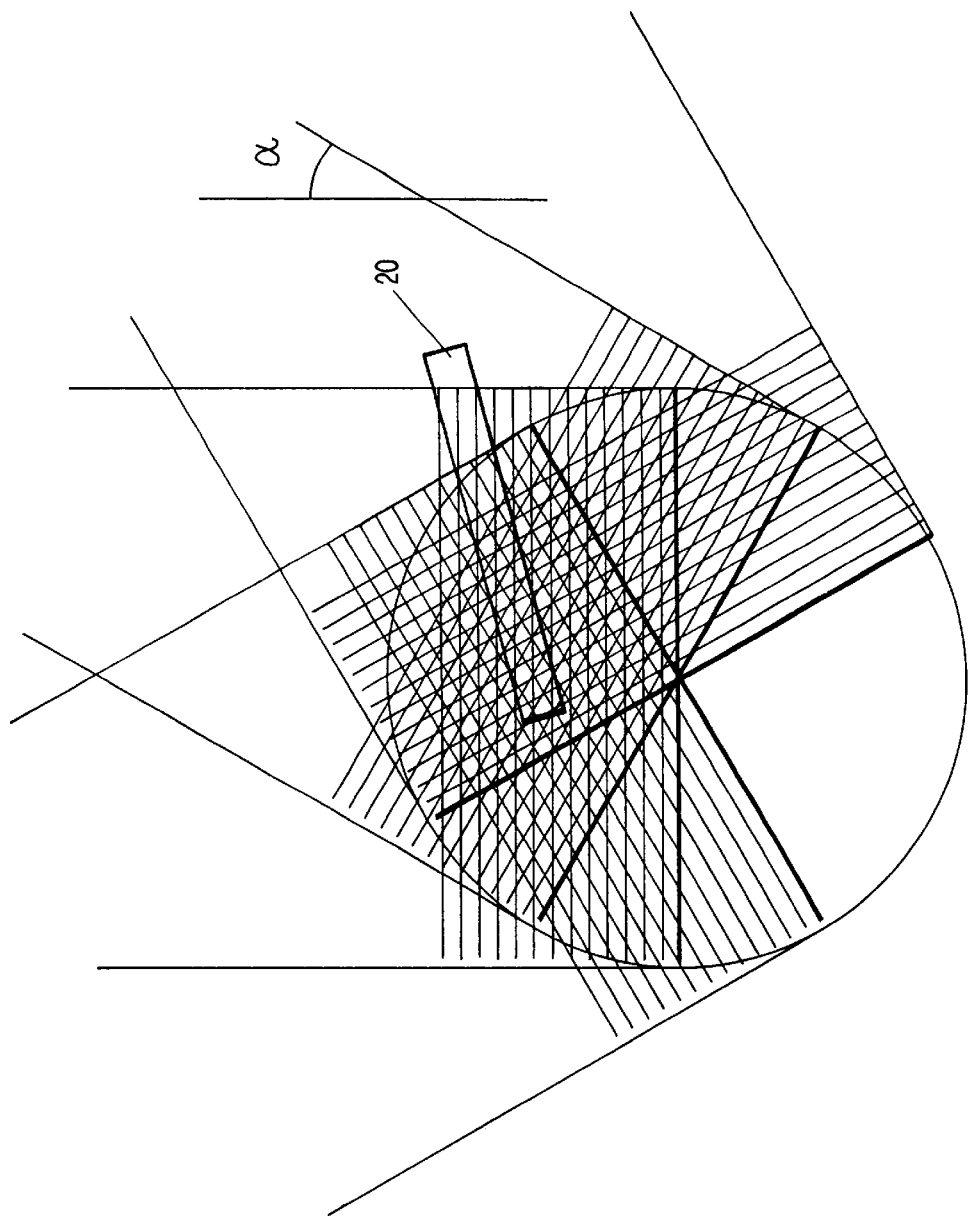
FIG. 19 shows the illumination of the object of the improved microscope resolution of the present invention under various angles of incidence, wherein thick lines show the depth limit of the irradiation, and also the pivot point for the various illumination angles.

The principle of tomographic reconstruction is outlined in FIGS. 19 and 20. Assume that the object under investigation is a phase object represented by the rectangle 20 in the center of FIG. 19. Whether it is a phase or amplitude object is of little relevance here. Since it is of dimension smaller than the wavelength, it will contribute in both cases to a change in phase of the backscattered light. The illumination is through a fiber, terminated in a needle of dimension as small as compatible with a sufficient return. The diameter of the tip of the needle can be smaller than the wavelength. Within a certain range of the tip, the backscattered radiation can be sent back towards the laser. Within that range, the longitudinal resolution corresponding to the phase variation is represented by parallel lines. The beat note variation is a measure of the phase shift of that backscattered radiation, and is recorded as a function of angle of illumination α as seen in FIG. 20. The rectangular object 20 represented in FIG. 19 would result in a measurement of beat note versus angle as plotted in FIG. 20.

8. Sensing Other Physical Quantities

The short pulse ring laser has unique properties that continuous wave ring lasers do not possess. Since the pulses go through different trajectories in "space-time", they can be used to probe properties of materials. Any property that will change the phase of the pulse after each round-trip can be detected with unprecedented sensitivity. This is because, unlike any other method, the short pulse ring laser transforms a phase shift $\Delta\phi$ into a frequency measurement $\delta v = \Delta\phi/\tau_{RT}$, where $\tau_{RT}$ is the cavity round-trip time. Since the beat frequency bandwidth is of the order of 1 Hz, for a cavity of a round-trip time of about 10 ns, the present invention allows measurement of a phase shift of $\Delta\phi \approx 1$ Hz×10 ns=$10^{-8}$. The various phenomena that cause a phase shift, and the corresponding sensitivities, are listed in Table 2 below.

TABLE 2

| PHYSICAL MEASUREMENT | SENSITIVITY | UNIT |
| --- | --- | --- |
| Phase shift on reflection | $10^{-8}$ | dimensionless |
| Elongation $\Delta l = \lambda\Delta\phi$ | $10^{-4}$ | Å |
| Index of refraction $\Delta n = (\lambda/2\pi l)\Delta\phi$ | $10^{-12}/2\pi$ | for l = 1 cm |

TABLE 2-continued

| PHYSICAL MEASUREMENT | SENSITIVITY | UNIT |
| --- | --- | --- |
| Magnetic susceptibility $\Delta\mu/\mu$ | $10^{-10}$ | dimensionless |
| Magnetic Field | $10^{-10}$ | Tesla |
| Electric Field | (estimated) 1 | μv/cm |

Sensitivity of the Short Pulse Gyro as a Sensor

The advantages for this technique to measure electric fields are that it is a non-evasive technique, can be applied to the measurement of very high voltages, and has a femtosecond temporal resolution.

9. Ultrasensitive Detector of Magnetic Susceptibility

Prior art metal detection is typically done by measuring the change in frequency of a coil, due to a change in magnetic susceptibility associated with the proximity of a metal. The larger the coil of the inductance loop of the resonant circuit, the larger the volume in which a change of susceptibility will affect the inductance of the coil, and hence the circuit resonance frequency. However, a larger coil also implies a lower resonance frequency.

The association of a ring laser cavity to a metal detection circuit makes it possible to increase the sensitivity of the device by at least five orders of magnitude, as shown below. Such a device is not only useful for metal detection, but even for geology (sensing differences in composition of the ground and aquifer layers, through changes in susceptibility).

Figure 6:
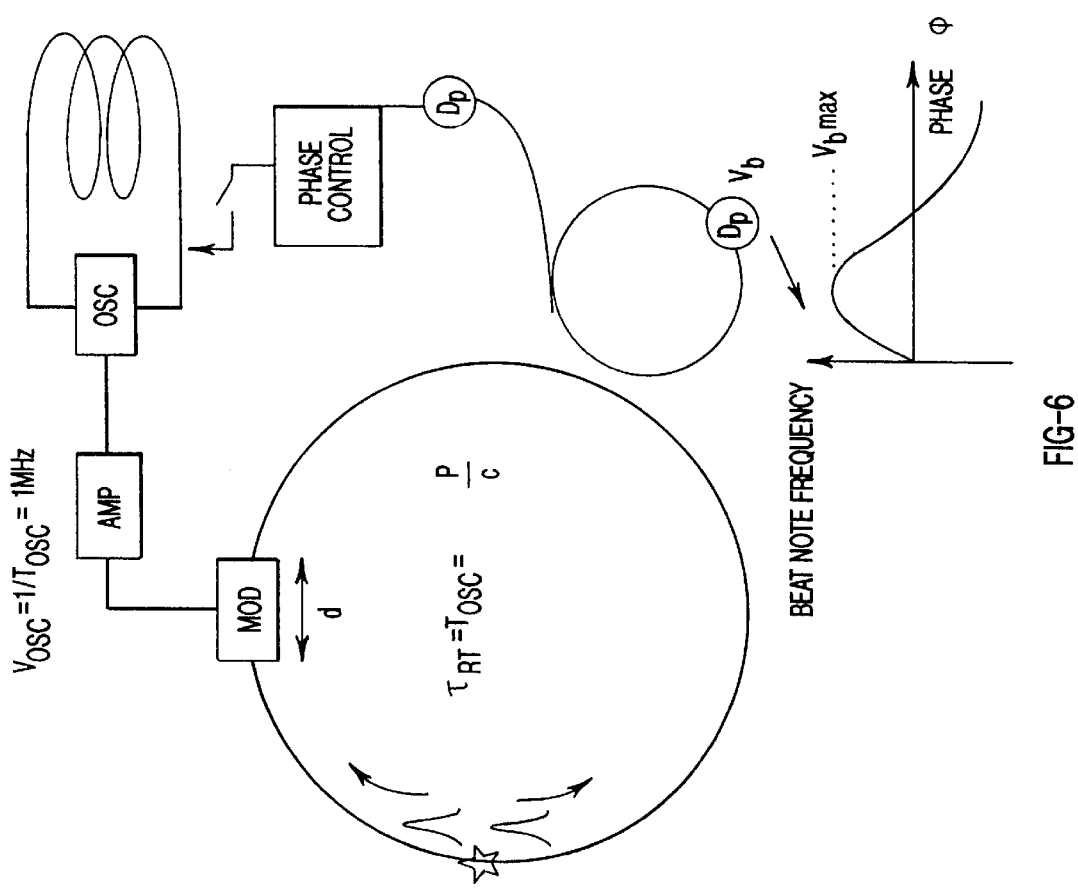
FIG. 6 shows the detection of a small change in frequency of an oscillator in accordance with the present invention.

Because of the low frequencies involved, such a device is only practical with fiber lasers. The principle of the detection is shown in FIG. 6. A standard way to introduce and control the frequency difference between the counter-propagating beams in the laser is to apply the pulse repetition rate after amplification to an intracavity electro-optic modulator. Generally, a tuned amplifier is used for this purpose. Let us call $\phi$ the phase of the sine wave modulation with respect to the time of arrival of one of the pulses at the modulator. For $\phi=0$, both pulses enter the modulator at a node (zero voltage) of the electrical signal applied to it, and the beat frequency will be zero. For $\phi=\pi/2$, there will be a maximum difference in index, $\Delta n$, seen by the counter-propagating pulses in the cavity. As a result, the beat frequency will have its maximum value. Beat notes up to several MHz have been demonstrated. See Scott Diddams, Briggs Atherton, and Jean-Claude Diels, "Frequency locking and unlocking in a femtosecond ring laser with the application to intracavity phase measurements", *Applied Physics B*, 63:473–480, 1996, which is incorporated herein by reference. Consider the following:

for $\phi=0 \to v_b=0$, $$\varphi = \frac{\pi}{2} \to v_b = v\frac{d}{P\Delta n} = 10^5 \text{ Hz}$$

$\Delta v_b=100$ Hz for $\Delta\phi=10^{-3}$ in 10 s, or a change in frequency of $(10^{-4}/10^6)=10^{-10}$ where d is the thickness of the electro-optic modulator in the cavity, and P is the perimeter of the cavity.

Assuming a maximum beat note $v_{bmax}=100$ kHz, which is a very conservative estimate considering that a 1.4 MHz beat signal was generated at a cavity round trip frequency of 100 MHz. A 1 MHz cavity will be much easier to modulate because the capacitance of the modulator will not represent as low an impedance as it would at 100 MHz.

Next, the feedback loop is replaced with a tunable oscillator. The capacitor in the tunable oscillator could be the electro-optic modulator. Assume that the oscillator is tuned to exactly the cavity repetition frequency, and that it is locked in phase with the cavity, φ=0. Then the beat note is identically zero. Assume next a small perturbation of the resonant circuit of the oscillator, such that the resonant frequency of the oscillator is shifted by a small amount δ such that $v_{osc}$=(c/P)+δ. As a result, the phase φ will drift. If δ is sufficiently small, the phase after a time $t_{obs}$ will be:

$$\phi = t_{obs} \times \delta \qquad (5)$$

The beat frequency will have changed from zero to:

$$v_b \approx v_{bmax} \times \delta \times t_{obs} \qquad (6)$$

Given that a beat note change from zero to 100 Hz is easily measured and considering an observation time of $t_{obs}$=10 s, the change of frequency of the oscillator that can be detected is δ=$10^{-4}$ Hz or about 100 parts per trillion. The frequency of 1 MHz corresponds to a wavelength of 300 m. The inductance (L) of a flat coil, of diameter R, with N windings in a cross section of radius a, is given by:

$$L = N^2 R \mu \left[ \ln\left(\frac{8R}{a}\right) - 2 \right] \qquad (7)$$

If this coil is part of an LC circuit, the resonance frequency being ω=1/√LC, a relative change in frequency of Δω/ω= $10^{-10}$ is also a measure of a change in inductance L or in susceptibility $\mu$:

$$-\frac{\Delta\omega}{\omega} = \frac{\Delta L}{2L} = \frac{\Delta\mu}{2\mu} \qquad (8)$$

Figure 7:
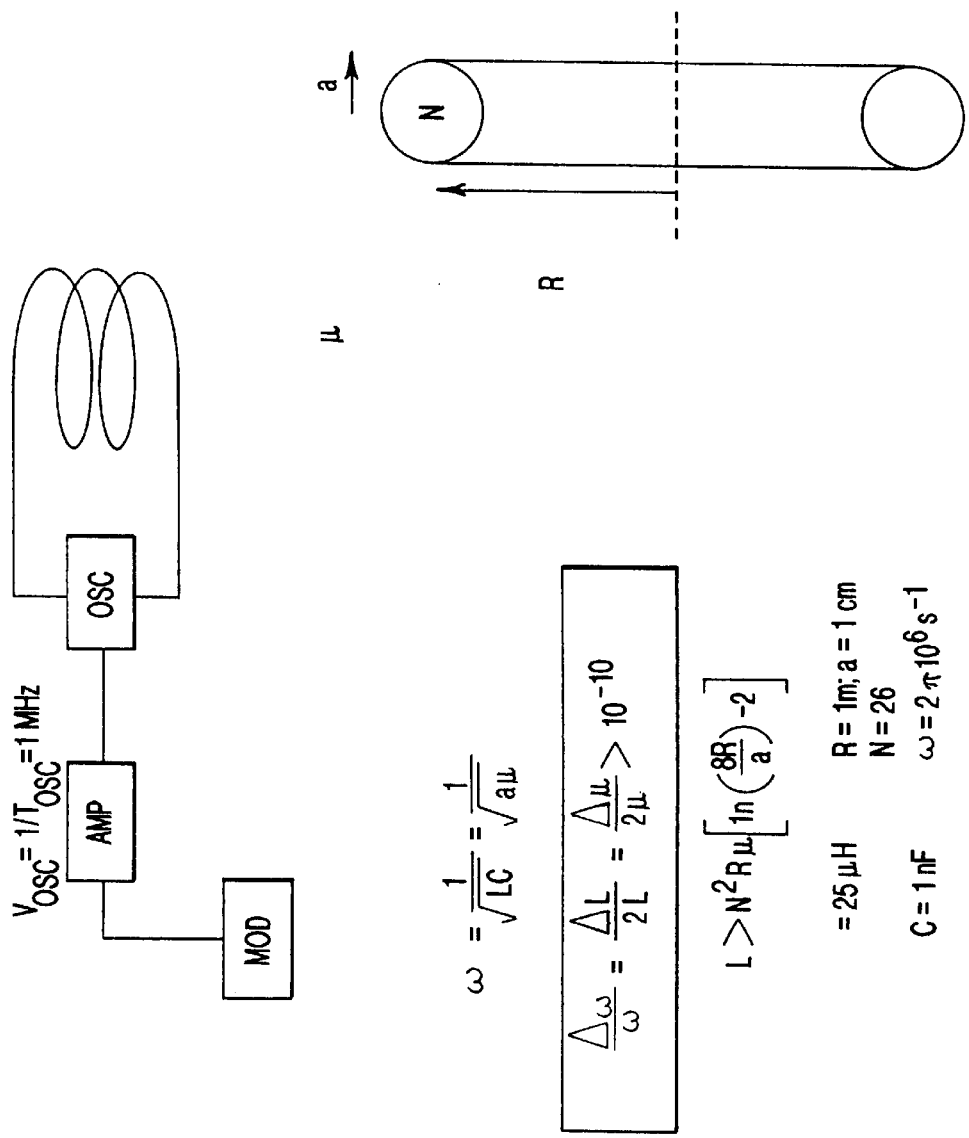
FIG. 7 is an example showing detection of a small change in oscillator frequency in accordance with the present invention.

As an example, see FIG. 7 which demonstrates detection of a small change in frequency of an oscillator. Let R=1 m, a=1 cm, and N=26. The coil would then have an inductance of L=25 μH which together with a capacitance (C) of 1 nF corresponds to a resonance frequency of 1 MHz.

Changes in $\mu_{effective}$ between sand, or dirt, and water is of the order of $10^{-6}$. Hence a sensitivity of $10^{-10}$ in the device provides a good detector for even underground water.

9.1 Measurement of the Time Derivative on n(t)

Figure 8:
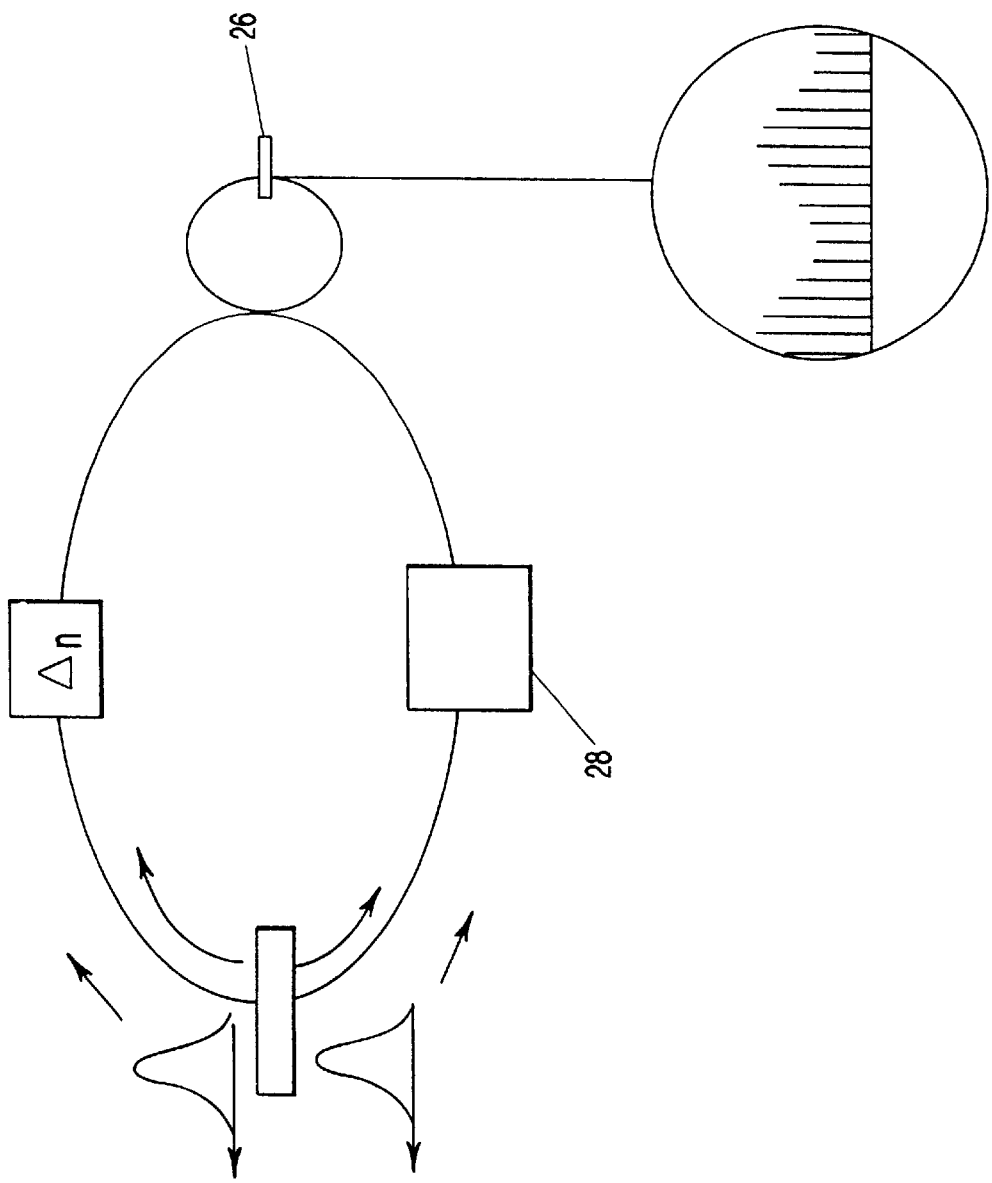
FIG. 8 shows a simple laser cavity wherein the nonlinear element is located ¼ cavity length away from the gain medium.

This technique is now applied to the time derivative of a fluctuating index of refraction n(t). It is assumed that the changes in index are much slower than the cavity round-trip time. Turning to FIG. 8, a detector is shown at 26 and gain is shown at 28. Assuming that the sample of length (l) is located opposite to the gain medium as in FIG. 8, sampled by each counter-rotating pulse at a time interval of $\tau_R/2$, the beat note will be given by:

$$\Delta v_b = \frac{l[n(t + \tau_R/2) - n(t)]}{c\tau_R} v = \frac{1}{2} \frac{dn}{dt} \frac{l}{\lambda} \qquad (9)$$

where c is the speed of light. Consider for instance the measurement of a periodic variation of the index of refraction, at a low frequency $\Omega_0$:

$$n(t) = \Delta n_0 \sin\Omega_0 t \qquad (10)$$

$$\frac{dn}{dt} = \Omega_0 \Delta n_0 \cos\Omega_0 t.$$

The largest beat note signal is thus:

$$\Delta v_b = \Delta n_0 \Omega_0 \frac{l}{2\lambda}. \qquad (11)$$

The large enhancement that takes place for synchronized perturbations of index is no longer present, because the cavity round-trip time cancels out in this expression. There are two solutions to increase the sensitivity of the device: 1) insert a delay in the detection loop; and 2) use a linear cavity with two pulses/cavity round-trip time, and split the pulses between a measurement and a reference branch.

9.1.1 Delay in the Detection Loop

Consider again n(t) being a periodic change on the index of refraction $n_0$ of the sample of length l. The change in mode frequency, for any direction, is given by:

$$v - v_0 = \frac{2\pi l}{\lambda \tau_R} n(t) = \frac{2\pi v_0 l}{P} n(t). \qquad (12)$$

Figure 9:
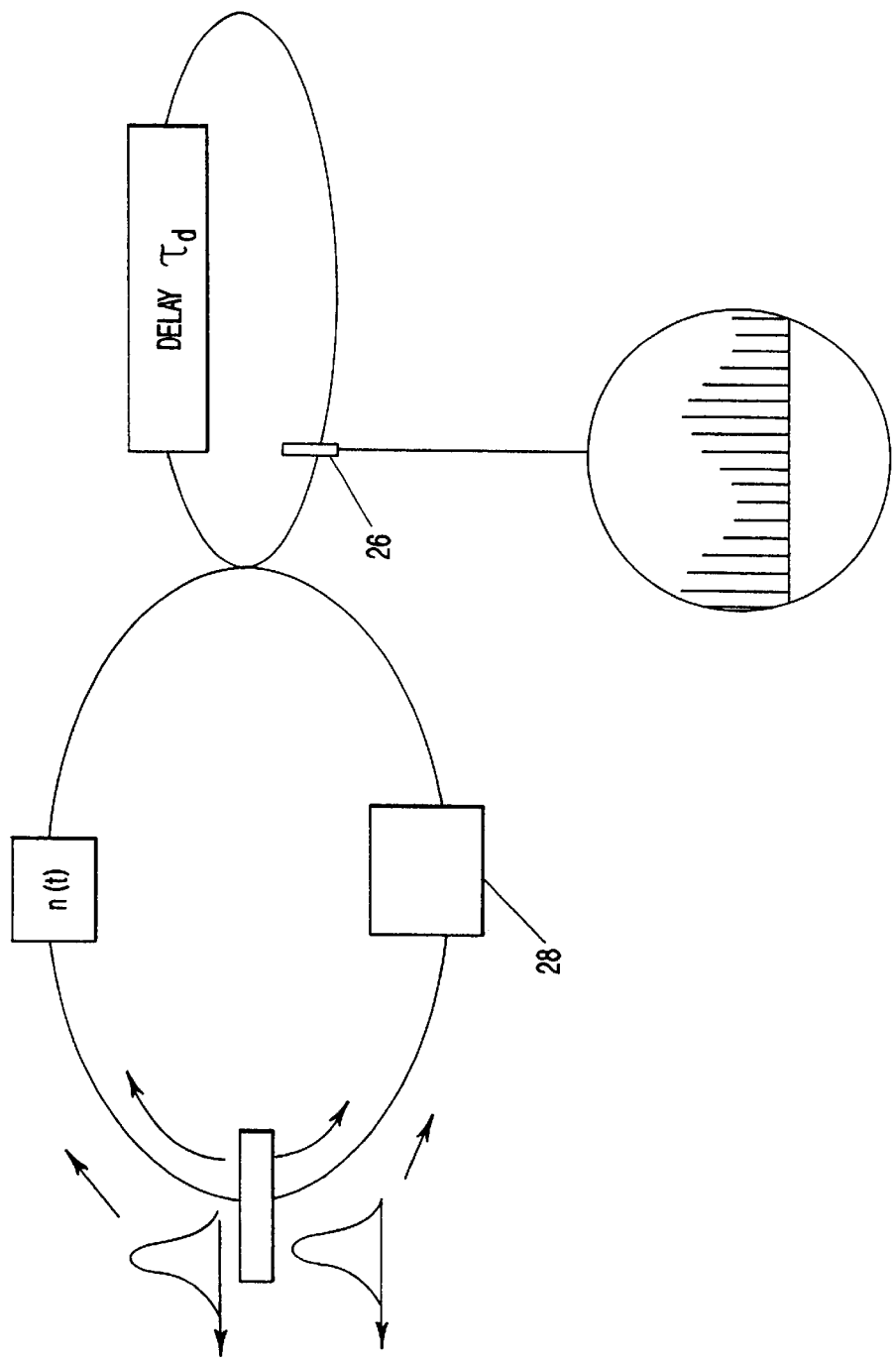
FIG. 9 shows the simple laser cavity of FIG. 8 wherein a delay is added to the detection loop.

In the arrangement of FIG. 9, the frequency of the mode propagating in one direction, at time t, is made to beat with the frequency of the counter-propagating mode at time t+$\tau_d$. The beat note is thus:

$$\frac{\delta v_b}{v_0} = \frac{2\pi l}{P} \tau_d \frac{dn}{dt} \qquad (13)$$

$$= 2\pi \Omega_0 \tau_d \frac{l}{P} \Delta n_0 \cos\Omega_0 t.$$

There is no requirement here that the two pulses to be correlated be the corresponding counter-propagating pulses in the ring laser. The principle of the measurement is simply to correlate one pulse of the cavity, with a pulse several cavity round-trips later. There is, however, some advantage in using the ring cavity, and the beat frequency between corresponding counter-propagating pulses to eliminate other sources of beat note, for instance, magnetic fields. It is interesting to note that, in this approach, the signal is independent of the absolute cavity length P, but depends on the ratio of the sample length to the cavity length. For stability reasons, both should be kept to a minimum. It is essentially the product of the delay by the modulation frequency of the signal (2π$\omega_0$) that will determine the sensitivity of this approach.

Consider as an example a laser at a wavelength of 1.55 μm, P=2 m, 2π$\Omega_0$=50 $s^{-1}$, a sample length l=1 m, and a delay $\tau_d$=1 μs. A beat signal $\Delta v_b$ of 100 Hz corresponds to an amplitude of the index modulation of $\Delta n_0 \approx 0.3 \times 10^{-8}$.

9.1.2 Linear Cavity With Two Branches

Referring to the basic principle given by FIG. 8, the ring cavity can be stretched to a line, becoming at the limit a linear cavity with two pulses/cavity round-trip time. Such a cavity has been successfully used for the measurement of small electro-optic coefficients. See Matthew J. Bohn and Jean-Claude Diels, "Measuring intracavity phase changes using double pulses in a linear cavity," *Optics Lett.*, 22:642–644, 1997, incorporated herein by reference. As in the case of the ring laser, the two pulses can be combined via an interferometric delay line onto a detector, and their beat note used for the measurement of small index difference seen by each pulse in the cavity.

Figure 10:
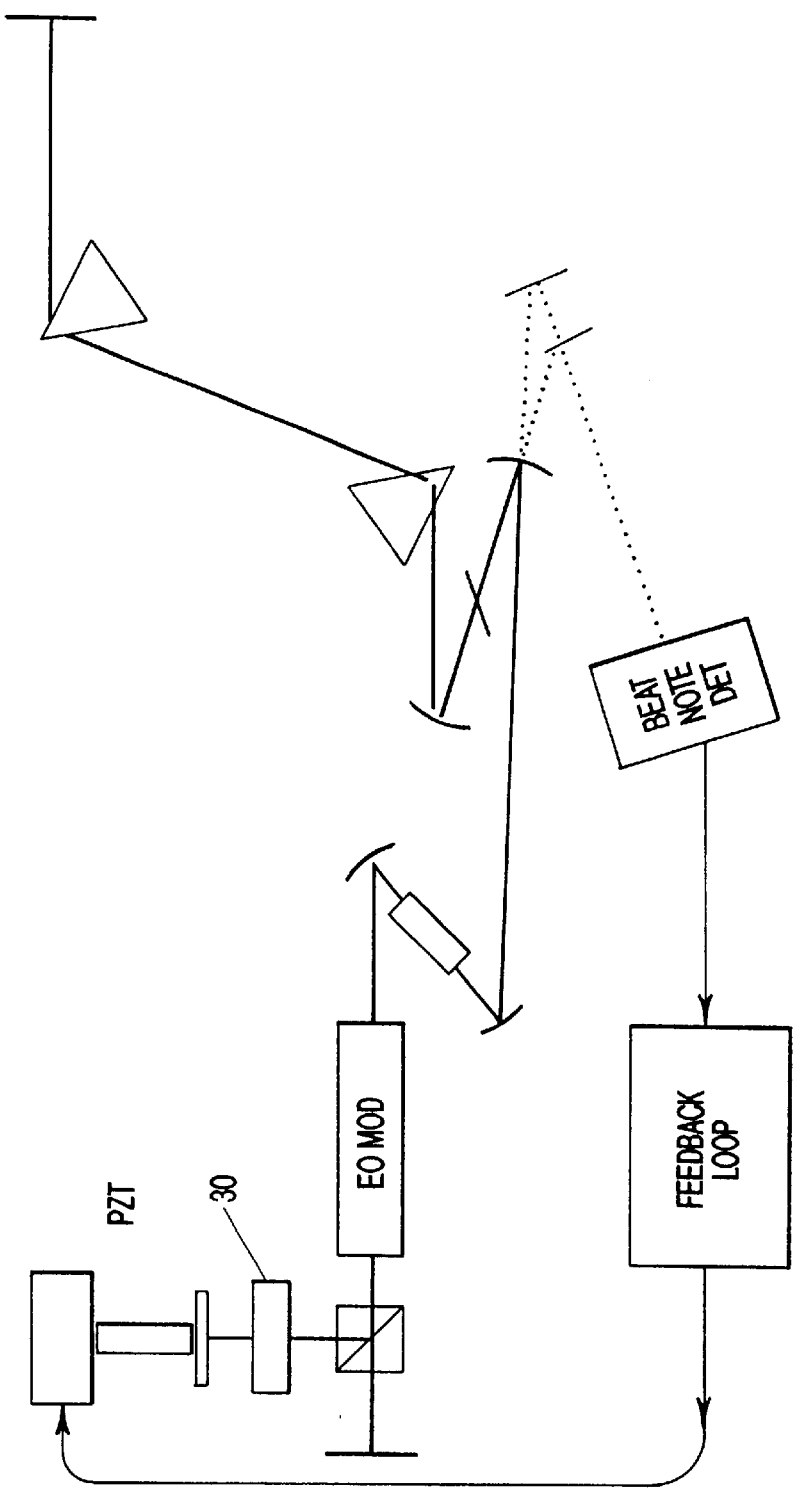
FIG. 10 shows the linear cavity design of the present invention for the measurement of small, slowly varying, changes of index of refraction.

In order to monitor slow variation of index, the two trains of pulses are separated spatially in an interferometric extension of the original cavity, as shown in FIG. 10 having a sample shown at 30. An electro-optic modulator is used intracavity to separate the two pulse trains in two separate arms of a balanced Michelson interferometer. The electro-optic modulator is driven at the cavity rate, to deflect one of the two intracavity pulse trains towards sample 30. Maximum sensitivity is realized if the two arms are made exactly equal (piezoelectric control will be required), as any imbalance causes a beat note to appear on the detector. The advantage over passive interferometry is that the change in index of refraction $\Delta n$ is converted into a frequency $\Delta \upsilon = 2\pi \upsilon \Delta n d/(2l)$, where $\upsilon$ is the optical frequency, d is the sample length and l the cavity length.

10. Measurements of High Voltage

High voltages can be measured through the change in index induced by either the Kerr effect of electrostriction in telecommunication fused silica fibers. The contribution to $n_2$ from electrostriction was measured to be ⅕ of the total $n_2$ in standard silica fibers (zero dispersion wavelength $\lambda_0=1.31$ $\mu$m) and ⅙ in dispersion shifted fibers (zero dispersion wavelength $\lambda_0=1.55$ $\mu$m). See A. Fellegara, A. Melloni, and M. Martinelli, "Measurement of the frequency response induced by electrostriction in optical fibers," *Optics Lett.*, 22:1615–1617, 1988; incorporated herein by reference. The electrostriction contribution to the field induced change in index, in units of $m^2/V^2$, is shown in Table 3 below:

TABLE 3

| Standard fiber | Dispersion shifted fiber |
|---|---|
| $3.8 \cdot 10^{-18}$ | $4.3 \cdot 10^{-18}$ |

The change in index in a field produced by two electrodes 1 m apart at 100 kV is thus approximately $$\Delta n_0 = 4 \cdot 10^{-18} \times 10^{10} = 4 \cdot 10^{-8} \tag{14}$$

10.1 Implementation With the Double Resonator

Figure 11:
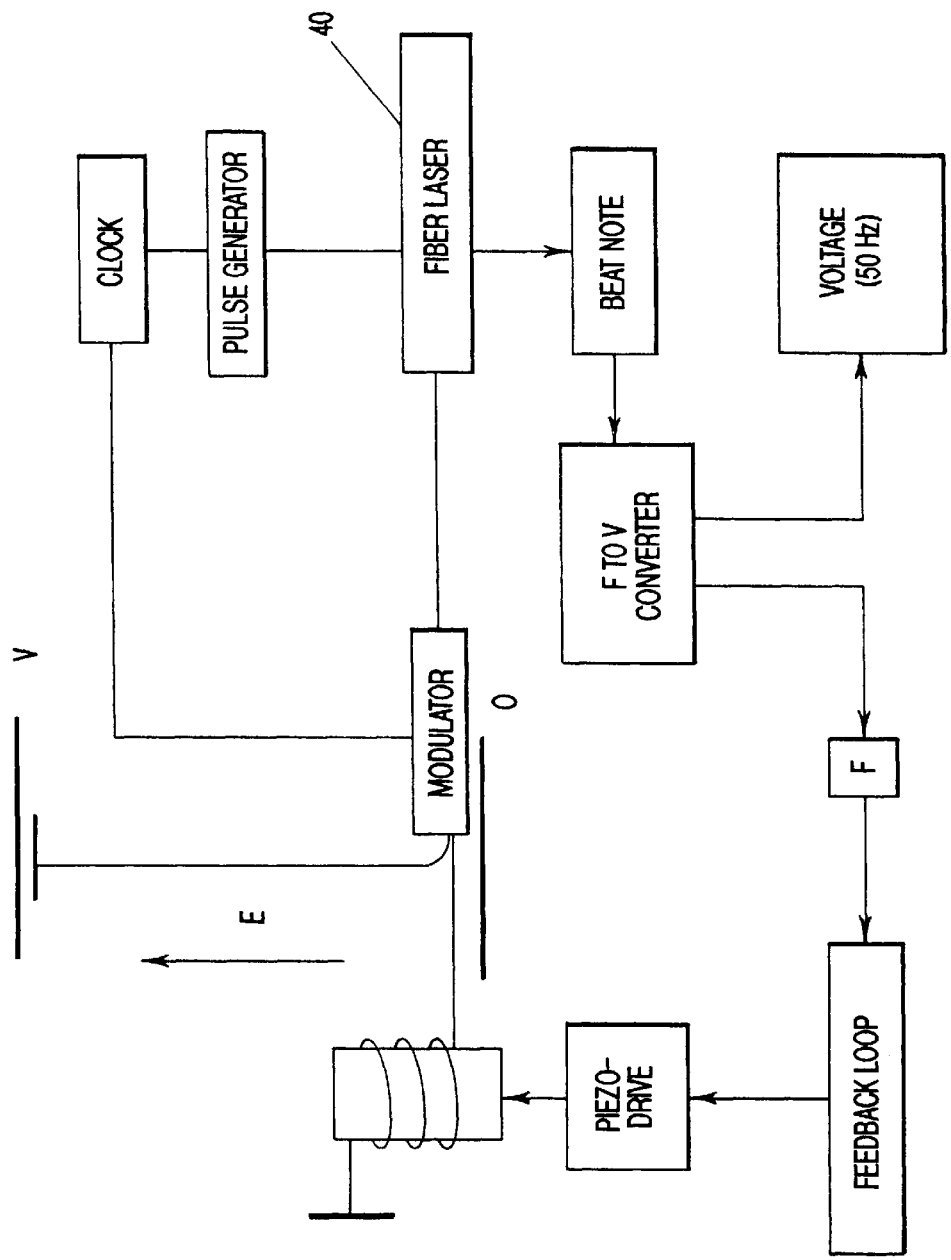
FIG. 11 shows a mode-locked fiber laser, with a cavity split into two sections by a modulator, applied to the measurement of high voltage in accordance with the present invention.

The basic principle of this measurement is that outlined above in the section entitled "Linear Cavity with Two Branches". The main part of the mode-locked fiber cavity is represented by a box 40 in FIG. 11. Two pulses/cavity round-trip are circulating in this resonator. A modulator splits one of the intracavity pulses into the sample fiber, stretched between the two high voltage electrodes. The other pulse is sent to a reference fiber, wrapped around a piezoelectric cylinder. The beat note between the two cavity pulses (see FIG. 10) is measured, and sent to a frequency to voltage converter. A simple feedback loop maintains a constant small pathlength difference between the two arms of the cavity. The 50 Hz component of the beat note variation is eliminated from this feedback loop by the filter F in FIG. 11. The 50 Hz component in voltage converted beat note is a measure of the high voltage.

The sensitivity of this configuration is particularly high. Consider the measurement of 100 kV over a distance of 1 m. The change of index by electrostriction is approximately $4 \cdot 10^{-10}$. The corresponding beat frequency is thus:

$$\upsilon_b = \upsilon_0 \times \frac{\Delta P}{P} = \frac{3 \cdot 10^{14}}{1.45 \times 1.55} \times \frac{4 \cdot 10^{-10}}{2} = 27 \text{ kHz}. \tag{15}$$

To implement this technique the two arms of the cavity are designed to compensate exactly all other possible sources of beat note. A feedback loop to maintain a constant beat frequency provides easy discrimination of the 50 Hz component from all other beat note producing effects.

10.2 Measurement of the Derivative of the Voltage

Figure 12:
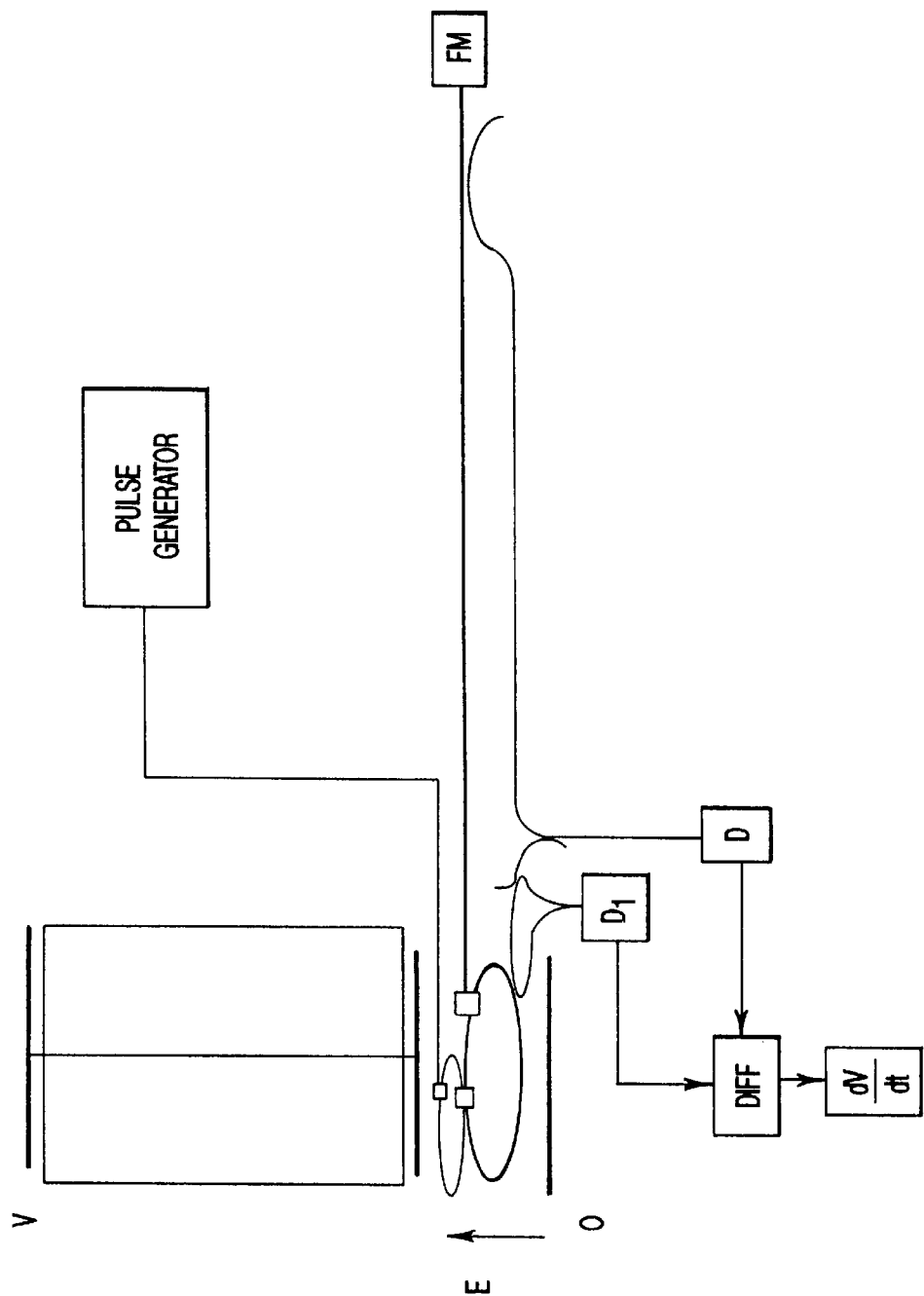
FIG. 12 shows a mode-locked sigma fiber laser, as in FIG. 3, used with a delayed arm in the direction of the beat note to arrive at a measured beat note that is directly proportional to the derivative of the voltage.

Attention is now turned to FIG. 12 wherein a mode-locked sigma fiber laser, as in FIG. 3, is used with a delayed arm in the detection of the beat note. The measured beat note is directly proportional to the derivative of the voltage. The technique outlined above in the section entitled "Measurement of the Time Derivative on n(t)" leads to a field measurement rather than a voltage over a long distance. The only requirement on the length l of fiber sampling in the field is that it be the largest possible fraction of the laser cavity perimeter P. In the arrangement of FIG. 12, the measurement fiber section is inserted in a high field region (of the order of 100 kV/m). For a ratio l/P=0.5, a field of 100 kV/m at 50 Hz, using (total Kerr nonlinearity) $n_2=2\cdot10^{-17}$ $m^2/V^2$, a delay in the measurement loop of $\tau_d=10^{-5}$ s, a wavelength of 1.55 $\mu$m, Eq. (10) leads to a beat note of $\Delta \upsilon_b=5$ kHz, which is easily measurable.

11. Stabilization to Reach the Quantum Limit of Noise 11.1 Stabilization to a Reference Cavity The best resolution achievable by the ring laser depends on the ability to read the beat frequency. The latter reading is limited by the bandwidth of the beat note itself. Apart from the bandwidth of the motion that one is analyzing, other contributions to the bandwidth of the beat note are: 1) motion of the mirrors; and 2) quantum limit of noise set by spontaneous emission.

The limit introduced by the motion of the mirrors is easy to establish. As one pulse travels around the cavity, it bounces on moving mirror surfaces. Since both circulating pulses do not hit each mirror surface at the same time, the cavity perimeter seen by either pulse is going to be slightly different, owing to the vibration of the mirror mount. Since the beat note $\Delta \upsilon$ is given by:

$$\frac{\Delta \upsilon}{\upsilon} = \frac{\Delta P}{P} \tag{16}$$

a mirror vibration of 1 micron amplitude at 100 Hz in a 1 m perimeter cavity will contribute to a beat note bandwidth of 100 Hz. Typically a bandwidth of the order of 1 Hz is observed with the Ti:sapphire laser, indicating that the mirror mount have a vibration amplitude much inferior to 1 $\mu$m. Since the cavity has to be stabilized in both directions, the controlling element should be as close as possible to a pulse crossing point. The Pound-Drever-Hall technique can be used to stabilize the ring laser perimeter to a zero-expansion reference cavity providing short term stabilization.

11.1.1 Stabilization to a $\lambda$ Transition

A powerful technique, for long term stabilization, is to lock the laser wavelength to an atomic frequency. The two-photon transition of rubidium is particularly interesting for this purpose, because it is extremely narrow, and all the modes of the laser will contribute (the sum of modes symmetrically to the line is also resonant). There is a resonance effect when the beat note becomes equal to the hyperfine splitting. This effect, applied to the two photon resonance of rubidium, can be used to lock the beat note to an atomic resonance, and have an absolute accuracy for the gyro effect, which would now be monitored through the error signal of the stabilized loop.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of making a bi-directional short pulsed ring laser, the method comprising the steps of:
   a) providing a substance having a light-intensity dependent index of refraction greater than that of other components in the laser;
   b) locating the substance in proximity to a beam waist of a laser cavity; and
   c) propagating bi-directional light pulses in the laser cavity and interacting the light pulses at the substance.

2. The method of claim 1 further comprising the steps of altering the laser beam diameter within the laser cavity with the intensity-dependent substance as a function of light intensity; and inserting an aperture in the cavity where beam diameter decreases with intensity.

3. The method of claim 1 wherein the laser comprises a laser selected from the group consisting of Ti:sapphire lasers, Nd:vanadate lasers, and Cr:LISAF lasers.

4. The method of claim 1 wherein providing a substance having an index of refraction that is light intensity-dependent comprises providing at least one substance selected from the group consisting of crystals and fluids.

5. The method of claim 4 wherein providing a substance comprises providing a fluid in a fluid-provider selected from the group consisting of glass cells and a free-flowing jets.

6. The method of claim 1 further comprising reducing dead band beyond observable limits.

7. The method of claim 6 wherein reducing dead band comprises electronically modulating the light pulses with non-constant modulation within the laser cavity.

8. The method of claim 7 wherein modulating the light pulses with non-constant modulation comprises inserting a modulator in the laser cavity and driving the modulator at the laser cavity round-trip frequency, and further comprising the step of measuring the changes in the beat frequency spectrum induced by rotation of the laser.

9. The method of claim 7 wherein electronically modulating with non-constant modulation comprises electronically modulating with a signal that is symmetrically switched between opposite polarities.

10. The method of claim 7 wherein electronically modulating with non-constant modulation comprises electronically modulating with a modulation selected from the group consisting of square wave modulation and white noise modulation.

11. The method of claim 6 wherein reducing dead band comprises predetermining and controlling the time at which the bi-directional pulses are launched such that they do not cross at any component within the laser cavity where light scattering occurs.

12. The method of claim 11 further comprising the step of controlling the pulse crossing point with a control selected from the group of controls consisting of a traveling wave gate and traveling wave gain.

13. The method of claim 11 wherein controlling the time at which the bi-directional pulses are launched comprises controlling the pulses by unidirectional amplification.

14. The method of claim 13 wherein unidirectional amplification comprises amplification by an amplifier selected from the group of amplifiers consisting of optical parametric amplifiers and doped gain fibers pumped by a short pulse.

15. The method of claim 13 wherein controlling by unidirectional amplification comprises the steps of providing a ring laser with bi-directional synchronous pumping and controlling the pulse crossing point with optical delay lines.

16. The method of claim 15 wherein the ring laser comprises an optical parametric oscillator pumped in two directions by a pulsed laser.

17. The method of claim 16 wherein the optical parametric oscillator is periodically poled.

18. The method of claim 16 further comprising the steps of:
   a) using the optical parametric oscillator near degeneracy; and
   b) reducing the fundamental noise limit by using the idler output of the optical parametric oscillator instead of the signal through output mirrors.

19. The method of claim 11 wherein controlling the launch time comprises controlling the timing in either direction of travel of the light pulses by a directional optical gate.

20. The method of claim 19 wherein controlling the timing by a directional optical gate comprises controlling a modulator within a fiber laser by providing a first electrical pulse to switch on the modulator and allowing light to pass through the gate in one direction, and then providing a second electrical pulse to switch the modulator thereby allowing light to pass in the opposite direction to the first.

21. A method of detecting magnetic susceptibility, the method comprising:
   a) providing a bi-directional pulsed ring laser, a modulator, an oscillator, and a coil;
   b) providing an electrical signal to control the frequency of the light pulses within the ring laser with the modulator;
   c) inserting the coil within the oscillator for determining the frequency of oscillation of the oscillator when the inductance of the coil is modified by changes in magnetic susceptibility of the environment around the coil; and
   d) detecting the change in phase between the arrival times of the bi-directional pulses at the modulator and the electrical signal of the modulator to determine the change in frequency of the oscillator.

22. The method of claim 21 further comprising the step of synchronizing the coil frequency and oscillator frequency to the laser cavity repetition frequency comprising the following additional steps:
   a) providing a signal from the bi-directional pulsing ring laser;
   b) mixing the laser signal with a signal of one of the oscillator or the coil, wherein the resultant mixed signal comprises an error signal;
   c) providing the error signal as an electrical signal to the oscillator or the coil whose signal has been mixed; and
   d) adjusting the frequency of the oscillator or coil whose signal has been mixed proportionally to the error in phase.

23. The method of claim 21 further comprising the step of achieving the maximum beat frequency in the laser.

24. The method of claim 21 wherein the laser comprises a fiber laser.

25. A bi-directional pulsed ring laser, said laser comprising:
   a laser having a cavity and light pulses propagating bi-directionally within said cavity;
   a pump; and
   a substance having a light-intensity dependent index of refraction greater than that of other components in the laser, said substance located in proximity to a beam waist of the laser cavity, said substance altering the laser beam diameter within the laser cavity as a function of light intensity.

26. The ring laser of claim 25 further comprising an aperture inserted in the laser cavity where beam diameter decreases with intensity to produce bi-directional short light pulses.

27. The ring laser of claim 25 wherein said laser comprises a laser selected from the group consisting of Ti:sapphire lasers, Nd:vanadate lasers, and Cr:LISAF lasers.

28. The ring laser of claim 25 wherein said substance having an index of refraction that is light intensity-dependent comprises at least one substance selected from the group consisting of crystals and fluids.

29. The ring laser of claim 28 wherein said substance comprises a fluid substance in a fluid-provider selected from the group consisting of glass cells and a free-flowing jets.

30. The ring laser of claim 25 further comprising means for reducing dead band beyond observable limits.

31. The ring laser of claim 30 wherein said means for reducing dead band comprises electronic non-constant modulation of the light pulses.

32. The ring laser of claim 31 wherein said electronic non-constant modulation comprises electronic modulation that is a signal that is symmetrically switched between opposite polarities.

33. The ring laser of claim 31 wherein said electronic non-constant modulation comprises electronic non-constant modulation selected from the group consisting of square wave modulation and white noise modulation.

34. The ring laser of claim 30 wherein said means for reducing dead band comprises means for predetermining and controlling the time at which the bi-directional pulses are launched such that they do not cross at any component within the laser cavity where light scattering occurs.

35. The ring laser of claim 34 wherein said means for predetermining and controlling the time comprises a directional optical gate for controlling the timing in either direction of travel of the light pulses.

36. The ring laser of claim 35 wherein said directional optical gate comprises a modulator within a fiber laser wherein a first electrical pulse switches on said modulator and allows light to pass through in one direction, and a second electrical pulse switches said modulator thereby allowing light to then pass in the opposite direction to the first.

37. The ring laser of claim 34 wherein said means for predetermining and controlling the time comprises a control selected from the group of controls consisting of a traveling wave gate and traveling wave gain.

38. The ring laser of claim 37 wherein said means for predetermining and controlling the time comprises an amplifier selected from the group of amplifiers consisting of optical parametric amplifiers and doped gain fibers pumped by a short pulse.

39. The ring laser of claim 37 wherein said means for predetermining and controlling the time comprises a ring laser with bi-directional synchronous pumping and optical delay lines for controlling the pulse crossing point.

40. The ring laser of claim 39 wherein said ring laser comprises an optical parametric oscillator pumped in two directions by a pulsed laser.

41. The ring laser of claim 40 wherein said optical parametric oscillator is periodically poled.

42. The ring laser of claim 40 wherein said optical parametric oscillator is near degeneracy.

43. A magnetic susceptibility detector comprising:

a bi-directional pulsed ring laser;

a modulator providing an electrical signal to control the frequency of the light pulses within the ring laser;

an oscillator;

a coil for determining the frequency of oscillation of said oscillator; and a detector for detecting the change in phase between the arrival times of the bi-directional pulses at the modulator and the electrical signal of the modulator to determine the change in frequency of the oscillator.

44. The detector of claim 43 wherein the frequency of each of said coil and said oscillator are synchronized with the cavity repetition frequency of said laser.

45. The detector of claim 43 wherein said laser is operating at maximum beat frequency.

46. The detector of claim 43 wherein said laser comprises a fiber laser.

* * * * *